US012689794B2

(12) United States Patent
McCarty et al.

(10) Patent No.: US 12,689,794 B2
(45) Date of Patent: Jul. 21, 2026

(54) SYSTEMS AND METHODS FOR OBSCURING PRESENTATION OF MEDIA OBJECTS DURING PLAYBACK OF VIDEO BASED ON INTERACTIONS WITH OTHER MEDIA OBJECTS

(71) Applicant: Adeia Guides Inc., San Jose, CA (US)

(72) Inventors: Michael McCarty, Agoura Hills, CA (US); Glen E. Roe, Simi Valley, CA (US)

(73) Assignee: Adeia Guides Inc., San Jose, CA (US)

( * ) Notice: Subject to any disclaimer, the term of this patent is extended or adjusted under 35 U.S.C. 154(b) by 10 days.

(21) Appl. No.: 19/029,322

(22) Filed: Jan. 17, 2025

(65) Prior Publication Data

US 2025/0175666 A1      May 29, 2025

Related U.S. Application Data

(63) Continuation of application No. 18/368,938, filed on Sep. 15, 2023, now Pat. No. 12,238,367, which is a continuation of application No. 17/848,177, filed on Jun. 23, 2022, now Pat. No. 11,800,180, which is a continuation of application No. 15/934,433, filed on Mar. 23, 2018, now Pat. No. 11,405,680.

(51) Int. Cl.
*H04N 21/431*      (2011.01)
*H04N 21/234*      (2011.01)
*H04N 21/442*      (2011.01)

(52) U.S. Cl.
CPC ... *H04N 21/4318* (2013.01); *H04N 21/23424* (2013.01); *H04N 21/4316* (2013.01); *H04N 21/44213* (2013.01)

(58) Field of Classification Search
CPC ......... H04N 21/4318; H04N 21/23424; H04N 21/4316; H04N 21/44213; H04N 21/47217; H04N 21/4882; H04N 21/812
See application file for complete search history.

(56) References Cited

U.S. PATENT DOCUMENTS

| | | | | |
|---|---|---|---|---|
| 6,698,020 | B1 * | 2/2004 | Zigmond | ........... H04N 21/4622 725/139 |
| 7,818,763 | B2 * | 10/2010 | Sie | ................... H04N 21/47202 705/14.69 |
| 9,451,401 | B2 * | 9/2016 | Lo | ........................ H04W 4/029 |

(Continued)

*Primary Examiner* — Nathan J Flynn
*Assistant Examiner* — Christine A Kurien
(74) *Attorney, Agent, or Firm* — HG LAW LLP

(57)      ABSTRACT

Systems and methods are provided for obscuring a presence of a media object in a video after a user fulfills an interaction requirement with a related media object. The system detects, an interaction with a media object and determines characteristics of the interaction. The system correlates characteristic of the interaction with an exclusion window and stores a record that links the exclusion window, user, and attribute of the media object. The system detects that a second media object will be displayed during playback of a video and determines an attribute of the second media object. The system retrieves the record by matching the attribute of the first media object from the record to the attribute of the second media object. In response to determining the exclusion window applies to the second media object, the system obscures the second media object while playing back the video.

20 Claims, 11 Drawing Sheets

(56)          References Cited

U.S. PATENT DOCUMENTS

| | | | |
|---|---|---|---|
| 9,852,452 B2* | 12/2017 | Lin | G06Q 30/0269 |
| 10,542,306 B2* | 1/2020 | Matthews | G06V 20/48 |
| 11,303,963 B2* | 4/2022 | Nguyen | H04N 21/44226 |
| 2002/0087403 A1* | 7/2002 | Meyers | G06Q 30/02 |
| | | | 705/14.69 |
| 2002/0174430 A1* | 11/2002 | Ellis | H04N 21/4753 |
| | | | 386/230 |
| 2004/0133909 A1* | 7/2004 | Ma | H04N 21/2668 |
| | | | 348/E7.071 |
| 2005/0257242 A1* | 11/2005 | Montgomery | H04N 21/4586 |
| | | | 725/116 |
| 2006/0156352 A1* | 7/2006 | Smith | H04N 21/234327 |
| | | | 725/86 |
| 2006/0218577 A1* | 9/2006 | Goodman | H04N 21/4143 |
| | | | 725/32 |
| 2010/0232690 A1* | 9/2010 | Kanatsu | G06F 16/93 |
| | | | 707/758 |
| 2010/0251289 A1* | 9/2010 | Agarwal | H04N 21/458 |
| | | | 725/34 |
| 2010/0299702 A1* | 11/2010 | Lo | H04L 67/55 |
| | | | 725/39 |

| | | | |
|---|---|---|---|
| 2013/0031579 A1* | 1/2013 | Klappert | H04N 21/812 |
| | | | 725/32 |
| 2014/0229978 A1* | 8/2014 | Rudman | H04N 21/4542 |
| | | | 725/32 |
| 2014/0310756 A1* | 10/2014 | Canney | H04N 21/262 |
| | | | 725/86 |
| 2014/0344060 A1* | 11/2014 | Watfa | G06Q 30/0269 |
| | | | 705/14.64 |
| 2015/0130808 A1* | 5/2015 | Takagi | G06F 1/1626 |
| | | | 345/428 |
| 2015/0188973 A1* | 7/2015 | Kacmarcik | H04L 67/131 |
| | | | 715/719 |
| 2016/0014474 A1* | 1/2016 | Lee | H04N 21/812 |
| | | | 725/34 |
| 2016/0026612 A1* | 1/2016 | Zhang | G06T 7/90 |
| | | | 715/234 |
| 2016/0345076 A1* | 11/2016 | Makhlouf | G06Q 30/02 |
| 2016/0358230 A1* | 12/2016 | Wilson | G06Q 30/0277 |
| 2016/0360292 A1* | 12/2016 | Lewis | H04N 21/242 |
| 2017/0272818 A1* | 9/2017 | Gattis | H04N 21/4394 |
| 2018/0247342 A1* | 8/2018 | Montgomery | G06Q 30/0276 |
| 2018/0343502 A1* | 11/2018 | Chen | H04N 21/8456 |

* cited by examiner

500

600

900

820A

745A

740

Modify an alpha channel attribute of the second media object to increase transparency of the second media object during playback of the video — 1105

745B

740

Obtain a set of preferences from a user profile — 1205

Determining a video of interest to the user based on the set of preferences — 1210

Replace the second media object with an indicator that the video of interest is available — 1215

720A

1400

1401 — Receive a command, from a second user, to play the video

1405 — Retrieve one or more records based on relationships the second user has with other users 1410 — Determine a relationship between the second user and the user that interacted with the first media object

735

1415 — Does the record of the first media object include an indication the exclusion window is available to the second user based on the determined relationship?

YES

NO

745

Obscure the second media object while playing back the video

SYSTEMS AND METHODS FOR OBSCURING PRESENTATION OF MEDIA OBJECTS DURING PLAYBACK OF VIDEO BASED ON INTERACTIONS WITH OTHER MEDIA OBJECTS

CROSS-REFERENCE TO RELATED APPLICATIONS

This application is a continuation of U.S. patent application Ser. No. 18/368,938, filed Sep. 15, 2023, which is a continuation of U.S. patent application Ser. No. 17/848,177, filed Jun. 23, 2022 (now U.S. Pat. No. 11,800,180), which is a continuation of U.S. patent application Ser. No. 15/934, 433, filed Mar. 23, 2018 (now U.S. Pat. No. 11,405,680), the disclosures of which are incorporated by reference in their entireties.

BACKGROUND

There are many opportunities for users to receive notifications, banners, and other content such as social network content, messaging, and other interactive content while consuming media assets. A user may become inundated with distracting content while consuming these media assets, and this may result in frustration as the user's viewing experience is interrupted. Moreover, if this distracting content relates to media or objects that the user has already, and recently, interacted with, then the content may be found to be particularly uninteresting to the user. If a user becomes interrupted too often by uninteresting content, the user may decide that watching the media asset is not enjoyable and cease playback of the media asset.

SUMMARY

The advancement of interconnected media services, content providers, and interactive opportunities has increased the amount of content that can be presented to a user during playback of desired content. Notifications, interactions, banners, and other content can all be delivered to a user in parallel with a user's desired content and shown over, next to, or near the content the user is consuming. Furthermore, the portability of media content and the capability of mobile devices to play back media content means that more and more users consume media content on displays that do not accommodate large displays. In particular, systems may present media objects to a user while the user is playing a video and have the media objects take precedence over the video even though the user did not choose to view the media objects. While presenting media objects to a user is, at times, useful, users do not often desire to have playback of content interrupted by other media objects, especially if those other media objects are objects the user has already, and recently, interacted with. Conventional systems and techniques exist to present media objects to a user while the user displays a video, but these systems fail to account for problems of presenting media objects during the display of video: (i) a user does not want to be constantly interrupted by media objects; (ii) media objects that may have been relevant to the user at an earlier time may not be relevant to the user after past interactions between the user and other media objects; and (iii) displays of devices used to generate a video may not be large enough to play a video and present a media object concurrently without blocking a portion of the video or media object.

Accordingly, to overcome the problems created when presenting media objects to a user while the user plays a video, systems and methods are provided herein for obscuring a media object based on user interactions with prior media objects. For example, a media guidance application may detect an interaction between a user and a first media object and may determine a period of time agreed to by the user during the interaction. The media guidance application may detect, during playback of a video, a second media object related to the first media object that is to be depicted during playback of the video. The media guidance application may then determine whether a playback time of the second media object is within the period of time to which the user agreed. In response to determining that the playback time of the second media object is within the period of time, the media guidance application may obscure the second media object from view by the user during playback. Accordingly, the user may receive a media object while playing a video and not be forced to view the media object if the user's past interactions satisfy requirements associated with the media object. By obscuring the second media object, the media guidance application can, based on the user's compliance with the requirements of the prior media object, alleviate the distraction of presenting media objects to a user while the user consumes content. Furthermore, the media guidance application can avoid displaying media objects to a user that would otherwise consume a limited display screen, e.g., a mobile device's display screen.

In some embodiments, the media guidance application obscures the presence of a media object in a video after a user fulfills an interaction requirement with a related media object. For example, the media guidance application may present a user with video content and display a sponsor's message for thirty seconds before beginning playback of the video content. The media guidance application may determine that the user has the option of watching the message for the full thirty seconds or closing the message early. If the user watches the message for the full length of time, the media guidance application may determine that the user should not be interrupted with a second sponsor message at a later date or time, or when viewing another movie. If the user closes the message before the full length of time expires, the media guidance application may instead determine that it will display media objects during the user's viewing of content at a later date or time, or when viewing another movie.

In some embodiments, the media guidance application may determine that a user viewed a portion of a media object before closing the media object and store an indication of the length of time the media object was allowed to play. The media guidance application may then, upon receiving a subsequent indication that a media object should be presented, resume display of the media object at the point where the user previously closed the media object. Thus, the media guidance application may display a complete media object to a user over several viewings of media objects by displaying several smaller segments of the media object. With this technique, the media guidance application may present an entire media object to a user rather than displaying, for example, the same five seconds every time the media object is presented. In those cases when a partial segment is shown, the media guidance application may also display a second media object for an allotted time following the first media object to ensure that the sponsored time slot is always met or exceeded. For example, if a sponsor issues a media object in a thirty-second time slot and a previously interrupted media object had been closed with ten seconds remaining, then a second media object can be shown after the ten remaining seconds of the first media object are viewed. In some embodiments, the media guidance application may play only the next twenty-seconds of the second media object, i.e., a portion of the second media object to consume the originally slotted thirty-seconds. In some embodiments, the media guidance application may extend the subsequent showing of the first media object with the second media object to forty seconds, i.e., the full time period required to play the remaining portion of the first media object as well as the full portion of the second media object. In some embodiments, the media guidance application may determine that the requirements are fulfilled if the user allows the second media object to be complete.

An interaction requirement may be any suitable requirement that a user perform an action or refrain from taking an action. For example, an interaction requirement may be that the user complete a survey or that the user refrain from closing a media object before the media object completes playback of content. In some embodiments, interaction requirements may comprise a result of complying with the interaction requirement, e.g., information indicating the user will be provided with an opportunity if the user complies with the interaction requirement.

A media object may be any supplemental content that is presented to a user that is associated with, contains, or embeds terms of an agreement, contract, offer, or opportunity available to a user. In some embodiments, for example, the media object may comprise a set of required user interactions that, if taken by the user, provide the user with an opportunity to avoid additional media objects at a future point. For example, a media object may be a graphical overlay with an opportunity for the user to either complete viewing of the overlay or close the overlay before viewing is complete. The media object may specify, explicitly or implicitly with metadata or other related text, that allowing content in the graphical overlay to complete playback will result in an opportunity for the user to skip additional media objects in the future. In some embodiments, the opportunity provided to the user in exchange for the user completing the requirements of the agreement may include the opportunity to attend an event, the obtain a product, or the consume content. In another example, a media object may comprise a link to content that is presented on the same or different display that presents opportunities for a user to interact with content in a manner specified by the media object, e.g., asking the user to complete a survey or asking the user to provide user-generated content that is displayed on the same or a different screen from the media object. If the user satisfies the requirements of the media object, the media object may provide opportunities for the user to access content that would not otherwise be available. The attributes, requirements, and results of interacting with a media object are varied and may be combined in any number of combinations. The results described herein are illustrative without limiting a media object.

A media guidance application may detect an interaction between a user and a first media object. For example, the media guidance application may detect that a user allowed a media object to complete playback or detect that a user completed a required action associated with the media object. In response to detecting the interaction between the user and the first media object, the media guidance application may determine a characteristic of the interaction between the user and the first media object. For example, the media guidance application may determine that the user clicked a link and completed a survey associated with a media object. The media guidance application may correlate the characteristic of the interaction between the user and the first media object with an exclusion window. In some aspects, the media guidance application may compare the user interaction with requirements of the media object to determine which of several exclusion windows should be applied to the user to suppress or obscure related media objects in the future.

A characteristic of an interaction may comprise any suitable information about a user's interaction with a media object. For example, a characteristic of an interaction may include locations where the user clicked on a display or on a media object, the time at which the media object was presented, the time at which the media object was closed, the duration the media object was presented, text entered in response to a media object, transactions generated in response to a media object, the number of times the user interacted with the media object, and/or the amount of time between presenting the media object and the user's interaction with the media object.

An exclusion window may be a set of configuration settings applied during playback of media assets to allow a media guidance application to suppress the generation of media objects. For example, an exclusion window may comprise a period of time during which a media guidance application may suppress or obscure presentation of media objects, i.e., an exclusion period. The exclusion window provides pertinent information to allow the media guidance application to determine whether an exclusion applies to the presentation of a media object while the media guidance application determines whether a media object should be presented or obscured. For example, an exclusion window may specify a start time, end time, exclusion length, viewer identity or identities, channels, media content, related media objects, applicable devices or device attributes, and/or attributes of relevant media content or media objects. In some embodiments, the exclusion window may specify an action or set of actions to be taken in response to determining the exclusion window applies. For example, the exclusion window may specify the mechanism to be employed to obscure a media object or parameters associated with obscuring the media object such as the amount of transparency to apply to the media object or a position on a display at which the media object will be displayed.

In some embodiments, the media guidance application may store, in a storage, a record that comprises a link between the exclusion window, the user, and an attribute of the first media object. For example, the media guidance application may determine that media objects related to a sponsor should not presented for the next 30 days, based on the user's interaction with a sponsor's message, and store a record that links the 30-day exclusion window to the user for media objects from that sponsor. The media guidance application may detect that a second media object is to be generated for display during playback of a video. For example, the media guidance application may play a video to the user and receive a second media object from a sponsor. In response to detecting that the second media object is to be generated for display during playback of the video, the media guidance application may determine an attribute of the second media object. For example, the media guidance application may extract the identity of the sponsor of the second media object. The media guidance application may retrieve the record of the link, from the storage, by matching the attribute of the first media object from the record to the attribute of the second media object. For example, the media guidance application may use the sponsor's identity and user's identity as lookup values to retrieve possible exclusion windows that match those parameters. In response to retrieving the record, the media guidance application may determine whether the exclusion window applies to the display of the second media object. For example, the media guidance application may retrieve a 30-day exclusion window that is active based on the current date versus a start and end date in the window. In another example, the presence of a matching record indicates that the exclusion window is active. In response to determining that the exclusion window applies to the display of the second media object, the media guidance application may obscure the second media object while playing back the video. For example, the media guidance application may set the transparency of the second media object to fully or partially transparent. In some embodiments, the media guidance application may refrain from displaying the media object, i.e., suppress the generation of the media object. In some embodiments, the media guidance application may set the x-y position of the second media object to an unused portion of the display or may set the x-y position of the second media object to a coordinate that exists outside the bounds of the display. In some embodiments, the media guidance application may send the second media object to a secondary display. In some embodiments, the media guidance application may set the z-ordering of the second media asset to a lower order than the z-ordering of the video content. In some embodiments, the second media object may be associated with audio content and the media guidance application may set the volume associated with the audio content to a lower volume or mute the audio content entirely. In some embodiments, the media guidance application may refrain from processing the second media object for presentation to conserve resources. In some embodiments, the media guidance application may replace the content of the second media object with content of interest to the user. For example, the media guidance application may obtain a set of preferences from a user profile. Based on the user's preference, the media guidance application may determine a video of interest to the user. For example, the media guidance application may determine that the user enjoys sports highlights and provide the user with a highlight from a recently aired pay-per-view match based on the user satisfying the requirements of the first media object (which may also be related to the same pay-per-view match). The media guidance application may replace the second media object with an indicator that the video of interest is available to the user based on the user satisfying a requirement of the first media object. For example, the media guidance application may inform the user that the pay-per-view highlight is available to the user by textual description.

An attribute of a media object may, for example, be any suitable information about the media object or information related to the media object. In some embodiments, an attribute of a media object may be the identity of a sponsor of the media object, information about the display of a media object, textual data included with the media object, a product's name, an offer ID, an event name, a genre, and/or a category. For example, if a media object is a message from a sponsor, then an attributes of that media object may be the sponsor's name, to allow the media guidance application to identify related media objects.

In some embodiments, the media guidance application correlates the characteristic of the interaction between the user and the first media object with the exclusion window based on textual data. The media guidance application may retrieve textual data related to the interaction between the user and the first media object. For example, the media object may comprise information stating a requirement of the interaction, e.g., "allow 30 seconds of playback of media object without closing to receive 30 days of sponsor-free viewing." In some embodiments, the media guidance application may parse the textual data to obtain a set of parameters corresponding to the interaction between the user and the first media object. For example, the media guidance application may, using control circuitry for example, analyze "allow 30 seconds of playback of media object without closing to receive 30 days of sponsor-free viewing" and extract parameters comprising "30 seconds," "playback of media object," and "without closing," "30 days," and "sponsor-free." The media guidance application may analyze the set of parameters to determine a requirement. For example, the requirement may be that the user must allow the media object to play for its full length (30 seconds) without closing the media object to satisfy the requirements of the media object. The media guidance application may analyze the set of parameters to determine an exclusion period to apply to the exclusion window. For example, the media guidance application may determine the exclusion window is a 30-day window during which media objects for that sponsor are not generated for presentation. The media guidance application may determine whether the characteristic of the interaction between the user and the first media object satisfies the requirement. For example, the media guidance application may determine whether the user allowed the media object to play back for 30 seconds without closing the media object. The media guidance application may, in response to determining that the characteristic of the interaction between the user and the first media object satisfies the requirement, apply the exclusion period to the exclusion window.

In some embodiments, the media guidance application may analyze the set of parameters to determine the exclusion period to apply to the exclusion window based on a subject from the parameters. For example, the textual data of the media object may contain a name or description of the sponsor of a media object or of content in the media object. During the parameter extraction, the media guidance application may also extract this content as a parameter. In some embodiments, the media guidance application may determine a subject from the set of parameters. For example, the media guidance application may identify the name of the sponsor as a parameter and use that name as a subject. The media guidance application may obtain, from a user profile, an interaction history for the user based on the subject. For example, the user profile may contain a log of the user's interactions with media objects and the media guidance application may retrieve interactions for the subject of interest based on a keyword association in the user profile. The media guidance application may analyze the interaction history to determine an interaction frequency. For example, the media guidance application can determine an interaction frequency based on an average amount of time between user interactions with media objects related to the subject. The media guidance application may determine the exclusion period based on the determined interaction frequency. For example, the media guidance application may determine that a user interacts with related media objects once every three months and determine the exclusion period based on that time. In some examples, the media guidance application may use the average time as the exclusion period, while in other examples the media guidance application may use some percentage (either less than or more than one hundred percent) of the average for the exclusion window.

In some embodiments, the media guidance application may determine that the exclusion window is explicitly stated in a parameter. For example, the parameters may include "30 days," and "sponsor-free." In response to determining the set of parameters comprises the exclusion time period, the media guidance application may extract the exclusion period from the set of parameters.

In some embodiments, the media guidance application may provide an opportunity to the user to comply with another set of requirements to extend the exclusion period. For example, the media guidance application may present a shorter message to the user reminding them of a subject in the first media object close to the end of the full exclusion period. In some embodiments, the media guidance application may detect that the exclusion period is within a threshold period of expiring. For example, the media guidance application may determine that that 30-day exclusion period will lapse in three days. In response to detecting that the exclusion period is within a threshold period of expiring, the media guidance application may prompt the user to satisfy a requirement of a third media object. For example, the media guidance application may ask the user to watch a short message from the sponsor to extend the exclusion for another 10 days. By using thresholds, the media guidance application may determine when it is appropriate to allow the user to renew the exclusion window without unduly burdening the user with additional media objects.

The media guidance application may determine whether the user satisfied the requirement of the third media object, e.g., that the user watched the short message. In response to determining the user satisfied the requirement of the third media object, the media guidance application may modify the exclusion period of the exclusion window based on the third media object. For example, the new message may be associated with a 10-day extension that is applied to the existing exclusion window. If the user did not satisfy the requirements of the third media object, the media guidance application may allow the exclusion period to lapse. After the lapse of the exclusion period, the media guidance application may detect that a fourth media object that is related to the first media object is to be generated for display. In response to determining that the fourth media object is related to the first media object, the media guidance application may determine whether the exclusion period of the exclusion window has expired and generate, for display, the fourth media object.

In some embodiments, the media guidance application may store the exclusion window based on a general attribute of the media object that associates the exclusion window with several subjects. For example, a media object may be presented by a sponsor and the media guidance application may determine that several similar sponsors present media objects as well. In response to satisfying the requirements of one media object, the media guidance application may determine that an exclusion window should be applied to media objects for similar sponsors. As described herein, the media guidance application may retrieve textual data related to the interaction between the user and the first media object and parse the textual data to obtain a set of parameters corresponding to the interaction between the user and the first media object. For example, the media guidance application may determine that the user filled out a survey related to the media object that applies not just to the current sponsor but that would also apply to surveys issued by other sponsors. The media guidance application may determine a set of related subjects based on the set of parameters. For example, each of the set of subjects may share a parameter.

Further, the media guidance application may determine an attribute of the first media object based on the set of subjects that is shared by each of the matching subjects. For example, if each sponsor is from a similar genre, the shared attribute may be the name of the genre or, if a media object is related to a brand, then the attribute may be the category that encompasses that brand.

In some embodiments, the media guidance application may incentivize the user to interact with the first media object within a certain time by, for example, providing different exclusion windows based on the speed at which the user responds. For example, the media guidance application may determine a first user reaction time based on a length of time between an initial display of the first media object and the interaction between the user and the first media object. For example, the media guidance application may determine that the user took 15 seconds to respond to a survey provided by the first media object. The media guidance application may then correlate the characteristic of the interaction between the user and the first media object with the exclusion window based on the reaction time. For example, the media guidance application may retrieve a plurality of other user reaction times. The media guidance application may determine that users reacted to the first media object and determine those users' reaction times. The media guidance application may then compare the first user reaction time to the plurality of other user reaction times. For example, the media guidance application may order the reaction times for the users. The media guidance application may select the exclusion window from a plurality of exclusion windows based on the comparing the first user reaction time to the plurality of other user reaction times. For example, the exclusion window for the fastest reaction time (or top 10% of reaction times) may provide a longer or more robust (e.g. covering more devices, more subject matters, other related users) exclusion window than is given to users with slower reaction times.

In some embodiments, the media guidance application may apply the exclusion window to other users based on a first user's interaction with the first media object. For example, the media guidance application may receive a command, from a second user, to play video content. During playback of the video content, the media guidance application may detect that a second media object is to be presented to the second user as described above. The media guidance application may then retrieve one or more records of exclusion windows based on relationships the second user has with other users. For example, there may be several exclusion windows available to the second user based on not just the second user's interactions with media objects, but also on the interactions that other users made with media objects. Some of these exclusions may apply to the second user. For example, a media object may provide exclusion windows to a user that interacted with the media object and apply the exclusion window to other members of a user's household. In some embodiments, the media guidance application may determine a relationship between the second user and the user that interacted with the first media object. For example, the media guidance application may determine the users are husband and wife or cohabitate in the same home. In some embodiments, the media guidance application may determine that the record of the link of the exclusion window to the first user further comprises an indication the exclusion window is available to the second user based on the determined relationship.

It should be noted that the systems and/or methods described above may be applied to, or used in accordance with, other systems and/or methods.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 14 depicts an illustrative flowchart of a process for obscuring a presence of a media object in a video for a second user after a first user fulfills an interaction in accordance with some embodiments of the disclosure.

DETAILED DESCRIPTION

Systems and methods are described herein for a media guidance application that detects an interaction between a user and a first media object and determines a period of time agreed to by the user during the interaction. The media guidance application detects, during playback of a video, a second media object related to the first media object that is to be depicted during playback of the video. The media guidance application determines whether a playback time of the second media object is within the period of time to which the user agreed. In response to determining that the playback time of the second media object is within the period of time, the media guidance application obscures the second media object from view by the user during playback.

As an example, a user may be watching a movie and receive a message from a sponsor describing promotional materials such as an opportunity to participate in an event, or products available for a limited-time, or a message advocating a position to the user. The message, i.e., media object, may be related with an action the user is required to take to meet the requirements of the media object. For example, the user may need to allow the entire message to play without closing the message. In some embodiments, the media object may state specific actions the user should take to fulfill the requirements of the media object. In return for meeting the requirements of the media object, the user may receive a benefit. For example, the user may be allowed to access content that would not be otherwise available or may be given the opportunity to participate in an event otherwise not available to the user. In some embodiments, the user may be given the opportunity to obscure, e.g., hide, future media objects that are related to the media object in question. In some embodiments, the opportunity to obscure subsequent media objects may be limited to a certain time window, i.e., an exclusion period. In some embodiments, the media object may include an explicit statement of the exclusion period while in other embodiments the time period may be implied or may be determined by characteristics of the user's interactions with the media object. Should the user fulfill the requirements, a media guidance application may save a record that an exclusion window is being applied for the user on media objects related to the fulfilled media object so that a second media object that appears during the exclusion period can be identified and obscured per the user's agreement or the user completing the necessary actions.

Figure 1:
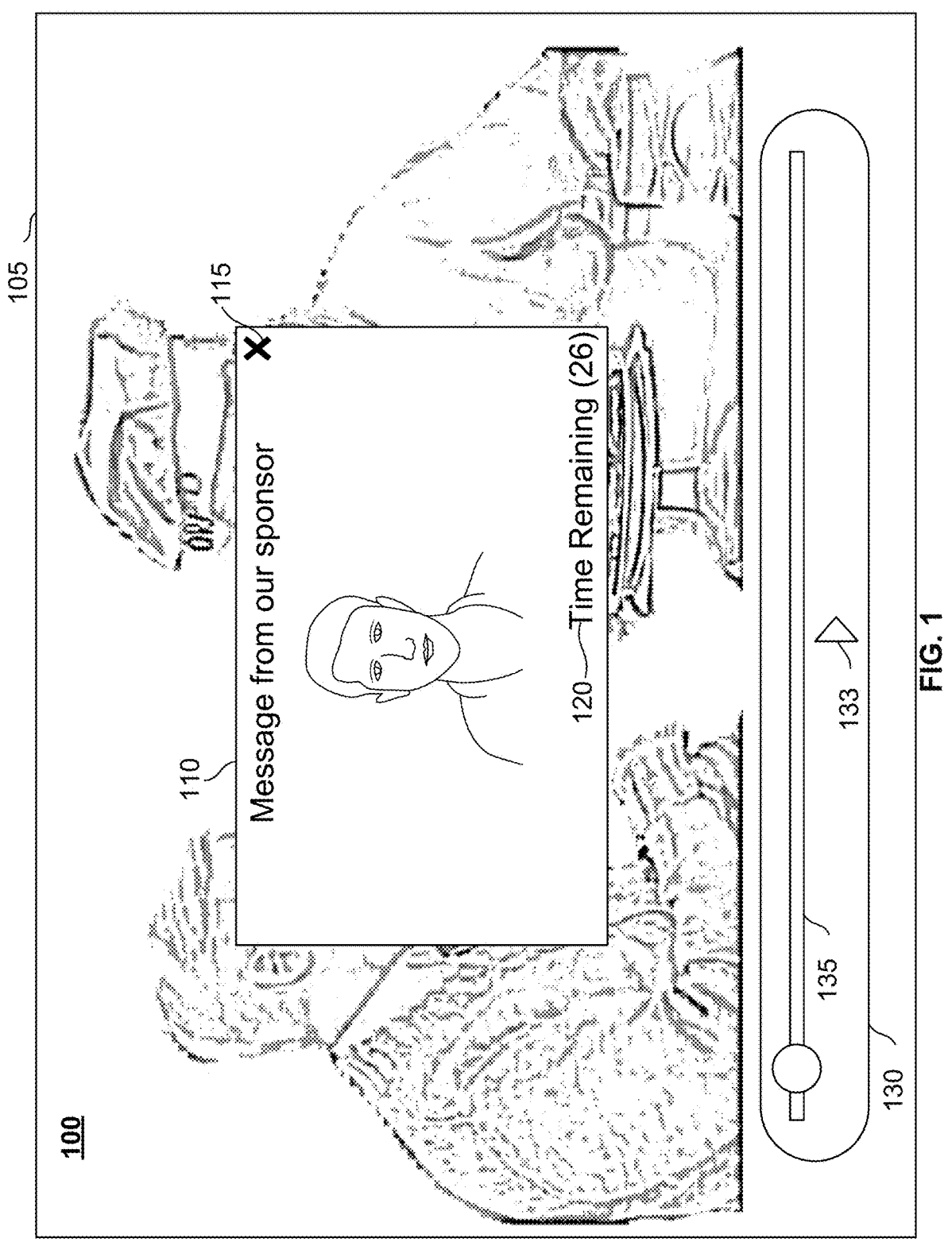
FIG. 1 depicts an illustrative embodiment of a display screen that may be used to display a media object on a device during playback of a video in accordance with some embodiments of the disclosure.

FIG. 1 depicts an illustrative embodiment of a display screen that may be used to display a media object on a device during playback of a video in accordance with some embodiments of the disclosure. FIG. 1 depicts a user equipment device 100 that implements a media guidance application 105 by control circuitry, which may be located in a user equipment, at a remote server, or distributed across the user equipment and the remote server. The functionality of user equipment, control circuitry, and the media guidance application is described in further detail with respect to FIGS. 3-6.

In FIG. 1, a media guidance application 105 is generating playback of a media asset. For example, the media guidance application 105 may be showing an episode of "Mr. Roger's Neighborhood." The media guidance application 105 depicts a video player screen 105 with playback controls 130 including a play control element 133 and time slider 135. The media guidance application 105 may present display a media object 110 such as a sponsor message. In some embodiments, the media object 110 may include an interface element 115, such as an exit button, and may further include interaction requirement information 120 such as the amount of time remaining in a sponsor's message.

In some embodiments, media guidance application 105 may, using control circuitry, detect an interaction between a user and a first media object. For example, the media guidance application 105 may detect that a user allowed a media object to complete playback or detect that a user completed required action associated with the media object. In other examples, control circuitry may detect that the user clicked on media object to perform an action associated with the object. Still other media objects may require that a user participate in an online survey or post length of time between content to fulfill the requirements of the media object. In another example, the media guidance application 105 may detect that a message from a product manufacturer includes an offer to the user to purchase a phone on an installment plan, e.g. twelve payments of 30 dollars per month. The media guidance application may detect that the user clicked on a promotional area of the media object and purchased the phone. Other media objects may provide a user with a limited-time offer that unlocks access to content made available only to users that interact with the media within a set amount of time. For example, the media guidance application may reside on a first device and communicate with a second device through a wired connection, such as Ethernet, or wireless connection, such as IEEE 802.11a/b/g/n ("WiFi"), Bluetooth, Near Field Communication ("NFC"), radio, or any other suitable wireless communication protocol. The media guidance application 105 may receive data from a second device indicating user input, an active application, or any other suitable metric related to use of the second device. For example, the second device may maintain a variable, flag, or other data structure indicating a state of a user input device of the second device. If the user is currently receiving input from the user input device, the variable, flag, or data structure may be set to indicate that the user input device is active. The media guidance application 105 may request or access the variable, flag, or data structure to retrieve the current state of the input device. The second device may also maintain a variable, flag, or data structure indicating a state of an output device of the second device. For example, if the second device is currently outputting video or audio content, the variable, flag, or other data structure may be set to indicate that an output device is active. The media guidance application may request or access the variable, flag, or data structure to retrieve the current state of the output device.

In some embodiments, the media guidance application 105 responds to detecting the interaction between the user and the first media object by determining a characteristic of the interaction between the user and the first media object. For example, the media guidance application 105 may determine, using control circuitry, that the user clicked a link, completed a survey associated with a media object, or performed some other action. In some embodiments, the media guidance application may determine the user allowed a video to complete playing for a required length of time as depicted in media object 110. In another example, the media guidance application may detect that the user responded to an offer to buy a phone on installments and entered into a 12-month purchase plan for a new phone. Other characteristics may include the amount of time the user spent performing an action related to the media object, the amount of time the user allowed the media object to be displayed, the amount of time it took for the user to react, a number of friends the user shared the media object with, an amount of content the user-generated in response to the media object 110. In some embodiments, the media guidance application 105 maintains a log file, database, or other data structure listing interactions the user made with the media object 110 along with the amount of time the user interacted. For example, the media guidance application 105 may record, in the log file, database, or data structure, each time a media object is launched, an indication of the media object, and the time at which the media object was launched. When the user closes, exits, or otherwise leaves the media object, the media guidance application 105 may record the time at which the user closed, exited, or left the media object. The media guidance application 105 may then calculate and record a total usage time. Alternatively, the media guidance application 105 may calculate the total usage time upon requesting information related to the media object from the log file, database, or data structure. The media guidance application 105 may further calculate an average time that the user interacts with the media object.

In some embodiments, the media guidance application 105 may correlate the characteristic of the interaction between the user and the first media object with an exclusion window. The media guidance application 105 may compare the user interaction with requirements of the media object to determine which of several exclusion windows should be applied to the user to suppress or obscure related media objects in the future. For example, the media guidance application 105 may determine that a user allowed a media object to play for 20 seconds before the user closed the media object. The media guidance application 105 may retrieve a set of criteria that correlates the amount of time the user allowed the media object to play with an agreed upon exclusion window. For example, allowing the media object to play for less than 10 seconds may result in no exclusion period, allowing the media object to play for between 10 seconds and 20 seconds may result in a five-day exclusion period, allowing the media object to play for between 20 seconds and 30 seconds may result in a 10-day exclusion period, and allowing the media object to play for more than 30 seconds may result in a 30-day exclusion period. In another example, the media guidance application may correlate the user's purchase of a new phone with a 12-month purchase agreement. As part of the agreement, the phone manufacturer may agree not to present related media objects to the user for all or some portion of the 12 months. This condition may be explicitly stated in the media object or in textual data, for example, provided to the user along with the media object. Thus, the media guidance application may correlate the user's purchase of the new phone with a, for example, 11-month window during which media objects related to the new phone are not presented.

In some embodiments, the media guidance application 105 may correlate the characteristic of the interaction between the user and the first media object with the exclusion window based on textual data. The media guidance application 105 may retrieve textual data related to the interaction between the user and the first media object. For example, the media object may comprise information stating a requirement of the interaction, e.g., "allow 30 seconds of playback of media object without closing to receive 30 days of sponsor-free viewing." In some embodiments, the media guidance application 105 may use syntactical and semantic parsing or otherwise determine information using part-of-speech ("POS") tagging or other natural language processing approaches. In some embodiments, the media guidance application 105 may parse the textual data to obtain a set of parameters corresponding to the interaction between the user and the first media object. For example, the media guidance application 105 may, using control circuitry for example, analyze "allow 30 seconds of playback of media object without closing to receive 30 days of sponsor-free viewing" and extract parameters comprising "30 seconds," "playback of media object," and "without closing," "30 days," and "sponsor-free." The media guidance application 105 may analyze the set of parameters to determine a requirement. For example, the requirement may be that the user must allow the media object to play for its full length, 30 seconds, without closing the media object to satisfy the requirements of the media object. In another example, the textual data may comprise an agreement, e.g., a purchase agreement for a phone, including the details of the agreement used for the parameters such as term, type of phone, cost of phone, form of payment, upgrade fees, media object exclusion period. The media guidance application 105 may determine, from the set of parameters, that a requirement of the media object is that the user completes a purchase of a product related to the media object or enter into an agreement, e.g., a purchase agreement, presented by the media object. The media guidance application 105 may analyze the set of parameters to determine an exclusion period to apply to the exclusion window. For example, the media guidance application 105 may determine the exclusion window is a 30-day window during which media objects for that sponsor are not generated. In some embodiments, the media guidance application may analyze an agreement, e.g., a product purchase agreement, and determine that a parameter of the agreement is that the user will receive an exclusion window for related media objects while the agreement is active, e.g., for the period of the agreement. The media guidance application 105 may determine whether the characteristic of the interaction between the user and the first media object satisfies the requirement. For example, the media guidance application 105 may determine whether the user allowed the media object to play back for 30 seconds without closing the media object. The media guidance application 105 may, in response to determining that the characteristic of the interaction between the user and the first media object satisfies the requirement, apply the exclusion period to the exclusion window. As discussed above, another example is that a media object may correspond with an agreement, such as a 12-month purchase agreement, that includes a clause ensuring the user will not receive related media objects for 11-months. The media guidance application may analyze the textual data to extract the 11-month window. For example, a parameter in the agreement may be "exclusion window" and be followed by a textual description of the 11-month window.

In some embodiments, the media guidance application may determine that a user viewed a portion of a media object before closing the media object and store an indication of the length of time the media object was allowed to play. The media guidance application 105 may then, upon receiving a subsequent indication that a media object should be presented, resume display of the media object at the point where the user previously closed the media object. Thus, the media guidance application 105 may display a complete media object to a user over several viewings of media objects by displaying several smaller segments of the media object. With this technique, the media guidance application 105 may present an entire media object to a user rather than displaying, for example, the same five seconds every time the media object is presented. In those cases when a partial segment is shown, the media guidance application may also display a second media object for an allotted time following the first media object to ensure that the sponsored time slot is always met or exceeded. For example, if a sponsor issues a media object in a thirty-second time slot and a previously interrupted media object had been closed with ten seconds remaining, then a second media object can be shown after the ten remaining seconds of the first media object are viewed. In some embodiments, the media guidance application 105 may play only the next twenty-seconds of the second media object, i.e., a portion of the second media object to consume the originally slotted thirty-seconds. In some embodiments, the media guidance application 105 may extend the subsequent showing of the first media object with the second media object to forty seconds, i.e., the full time period required to play the remaining portion of the first media object as well as the full portion of the second media object. In some embodiments, the media guidance application 105 may determine that the requirements are fulfilled if the user allows the second media object to be complete.

In some embodiments, the media guidance application 105 may analyze the set of parameters to determine the exclusion period to apply to the exclusion window based on a subject from the parameters. For example, textual data of a media object may contain a name or description of the sponsor of a media object or of content in the media object. In some embodiments, subject of the agreement may be a product that is the subject of a purchase agreement, e.g., a phone. During the parameter extraction, the media guidance application 105 may also extract this content as a parameter. In some embodiments, the media guidance application 105 may determine a subject from the set of parameters. For example, the media guidance application may identify the name of the sponsor as a parameter and use that name as a subject or may extract the brand, model, or type of a product. In some embodiments, the media guidance application 105 may determine the name of event or name of an opportunity as the subject of the first media object. In some embodiments, the media guidance application 105 may use natural language processing to determine the subject from the set of parameters. In some embodiments, the media guidance application 105 may query a remote server with information about the parameters to receive a determined subject. In some embodiments, the media guidance application 105 may obtain, from a user profile, an interaction history for the user based on the subject. For example, the user profile may contain a log of the user's interactions with media objects and the media guidance application may retrieve interactions for the subject of interest based on a keyword association in the user profile. The media guidance application 105 may analyze the interaction history to determine an interaction frequency. For example, the media guidance application 105 can determine an interaction frequency based on an average amount of time between user interactions with media objects related to the subject. In another example, the media guidance application 105 may use the user's transaction history or a term stated in an agreement related to a media object to determine that related media objects should be excluded during the period of the agreement or until a time at which the user is likely to be in the market for a related product. For example, the media guidance application may determine that the user purchases new phones anywhere from 12 months to 15 months, and thus determines an exclusion period for phone related media objects of 12 months. In some embodiments, the media guidance application may use interaction history for other user to infer an exclusion window. For example, the media guidance application may determine that the media object is related to the purchase of a new phone and that the average market length of a new phone is 14 months. Thus, the media guidance application may offer an exclusion window to the user based on the market length even when the user does not have prior interaction history that could be used to determine the exclusion period. In another example, the textual data or parameters may contain an explicit exclusion period such as 11 months based on a 12-month purchase agreement. The media guidance application 105, may for example, determine that a user interacts with media objects similar to the first media object once every 9090 days and, using the 9090-day frequency, the media guidance application 105 determines that the exclusion period of the exclusion window should be set to 9090 days. In some embodiments, the media guidance application 105 may determine an exclusion window based on a portion of or percentage of the frequency. For example, based on a 9090-day frequency, the media guidance application 105 may determine to set the exclusion to 80 days.

In some embodiments, the media guidance application may determine that the exclusion window is explicitly stated in a parameter. For example, the parameters may include "30 days," and "sponsor-free." In response to determining the set of parameters comprises the exclusion period, the media guidance application may extract the exclusion period from the set of parameters. In some embodiments, the media guidance application may use natural language processing to identify and extract an exclusion window from textual data of a purchase agreement associated with the media object, e.g., a 12 months from the text of a purchase agreement, or extract text explicitly stating an 11-month purchase agreement.

In some embodiments, the media guidance application 105 may store, in a storage, a record that comprises a link between the exclusion window, the user, and an attribute of the first media object. For example, the media guidance application may determine that media objects related to a sponsor should not be presented for the next 30 days, based on the user's interaction with a sponsor's message, and store a record that links the 30-day exclusion window to the user for media objects from that sponsor. An attribute of the media object may be a sponsor name, a company name, a genre, a product name, a media object category identifier, or other information related to a media object. The media guidance application 105 may create a record in a log file, database, or data structure that contains information linking, connecting, or relating the exclusion window, the user, and the attribute of the media object.

In some embodiments, the media guidance application 105 may store the exclusion window based on a general attribute of the media object that associates the exclusion window with several subjects. For example, a media object may be presented by a sponsor and the media guidance application 105 may determine that several similar sponsors present media objects as well. In response to satisfying the requirements of one media object, the media guidance application 105 may determine that an exclusion window should be applied to media objects for similar sponsors. For example, the media object may be related to an upcoming opportunity or event, and there may exists several sponsor's presenting media objects about the upcoming event and the user's interaction with a media object renders moot other sponsor's messages. The media guidance application 105 may determine that other media objects should not be presented to the user again. Thus, rather than storing the exclusion object based on an attribute unique to the sponsor or media object, the media guidance application 105 may instead analyze the media object for an attribute that would apply more broadly to similar media objects, e.g., based on the name of the event. As another example, the media guidance application 105 may retrieve textual data related to the interaction between the user and the first media object and parse the textual data to obtain a set of parameters corresponding to the interaction between the user and the first media object. For example, the media guidance application 105 may determine that the user filled out a survey related to the media object that applies not just to the current sponsor but that would also apply to surveys issued by other sponsors. In another example, the media guidance application may determine the media object is an offer to purchase a mobile phone from a particular manufacturer. The media guidance application may determine that the subject of the media object is phone, mobile phone, personal electronic, or the name of the phone manufacturer. The media guidance application 105 may determine a set of related subjects based on the set of parameters, e.g., other phone manufacturers based on the purchase of the phone, other personal electronic devices, or other categories of products. In some embodiments, the media guidance application 105 may extract parameters by using syntactical and semantic parsing. In some embodiments, the media guidance application 105 determines key phrases using part-of-speech ("POS") tagging or other natural language processing approaches and obtains names of subject matters, sponsor names, product names, genres, events, or other relevant objects from the current media object. The media guidance application 105 may determine that each of a set of subjects may share a parameter. For example, several sponsors of an upcoming event with media objects promoting an opportunity for the user to interact with the sponsor at an upcoming event may share a parameter related to the event name. Further, the media guidance application 105 may determine an attribute of the first media object based on the set of subjects that is shared by each of the matching subjects. For example, if each sponsor is from a similar genre, the shared attribute may be the name of the genre or if a media object is related to a brand, then the attribute may be a category that encompasses that brand. In another example, if the sponsor is promoting an opportunity for the user to interact with the sponsor at an event, the share attribute may be the name of the event.

The media guidance application 105 may detect that a second media object is to be generated for display during playback of a video. For example, the media guidance application 105 may play a video, such as an episode of "Mr. Roger's Neighborhood" as depicted in FIG. 1 to the user on a user equipment device 100. During playback the media guidance application 105 may receive a second media object for display. For example, the media guidance application may receive another message from a sponsor, be it the same or a different sponsor. In response to detecting that the second media object is to be generated for display during playback of the video, the media guidance application 105 may determine an attribute of the second media object. For example, the media guidance application 105 may extract the identity of the sponsor of the second media object. In another example, the media guidance application may have previously stored an exclusion window based on the user's agreement to a 12-month purchase plan on a mobile phone and the second media object may be a mobile phone from another manufacturer. The media guidance application 105 may retrieve the records of links between the exclusion window, the user and the media object from the storage by matching the attribute of the first media object from the record to the attribute of the second media object. For example, the media guidance application 105 may use the sponsor's identity and user's identity as lookup values to retrieve possible exclusion windows that match those parameters. In another example, the media guidance application 105 may use an attribute shared by several exclusion windows or several sponsors, e.g., the name of an upcoming event, to retrieve potentially matching exclusion windows. In another example, the media guidance application 105 may use the product type or manufacturer name related to a user's prior purchases.

In response to retrieving the record, the media guidance application 105 may determine whether an exclusion window applies to the display of the second media object. For example, the media guidance application 105 may retrieve several exclusion windows based on the current viewer's identity and an attribute of the second media object. In the retrieved exclusion windows, the media guidance application 105 may locate, as an example, a 30-day exclusion window that is active based on the current date versus a start and end date in the window. For example, the exclusion window may include a start date and end date, and the end date may be listed as after the current date. Or the exclusion window may not include the start date but includes the end date. In further examples, the presence of the exclusion window (without a start or end date) may indicate the exclusion window is active. In response to determining that the exclusion window applies to the display of the second media object, the media guidance application may obscure the second media object while playing back the video. For example, the media guidance application may set the transparency of the second media object to fully or partially transparent. In some embodiments, the media guidance application 105 may refrain from displaying the media object, i.e., suppress the generation of the media object.

Figure 2:
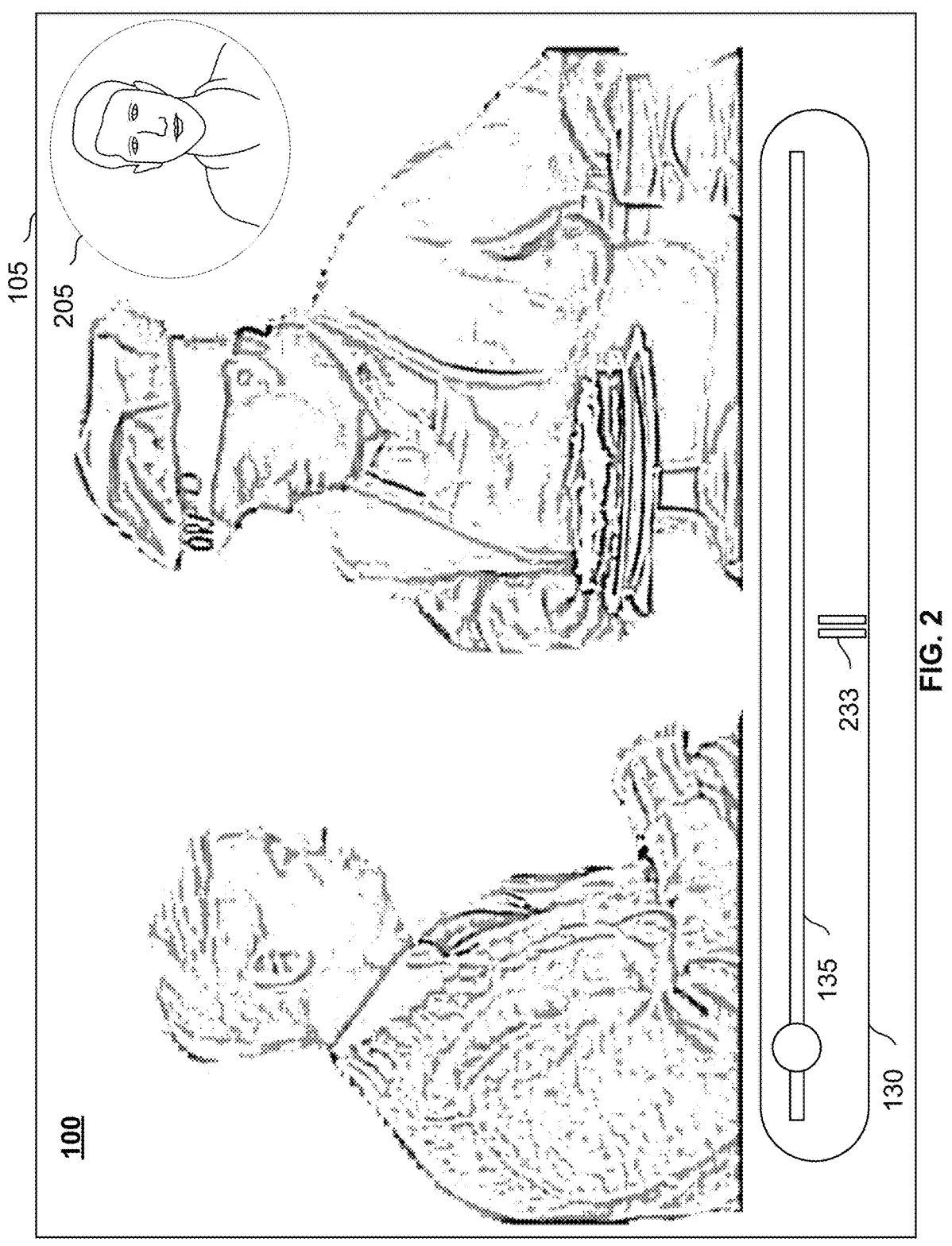
FIG. 2 depicts an illustrative embodiment of a display screen that may be used to display a media object on a device during playback of a video in accordance with some embodiments of the disclosure.

In some embodiments, the media guidance application 105 may set the x-y position of the second media object to an unused portion of the display or may set the x-y position of the second media object to a coordinate that exists outside the bounds of the display. For example, FIG. 2 depicts an illustrative embodiment of a display screen that may be used to display an obscured media object on a device during playback of a video in accordance with some embodiments of the disclosure. In FIG. 2, the media guidance application 105 is generating playback of a media asset. For example, the media guidance application 105 may be showing an episode of "Mr. Roger's Neighborhood." The media guidance application 105 depicts a video player screen 105 with playback controls 130 including a pause control element 233 and time slider 135. The media guidance application 105 may display a media object 205 such as a sponsor message. In FIG. 2, the media object 205 has been reduced in size and placed in a corner of the display in the media guidance application 105.

In some embodiments, the media guidance application 105 may send the second media object to a secondary display. For example, the media guidance application 105 may have a primary display, such as a television, and the media guidance application 105 may be in communication with a wireless device that can act as a secondary display. For example, the media guidance application 105 may reside on the first device and communicate with a second device 100 through a wired connection, such as Ethernet, or wireless connection, such as IEEE 802.11a/b/g/n ("WiFi"), Bluetooth, Near Field Communication ("NFC"), radio, or any other suitable wireless communication protocol. The media guidance application 105 may send instructions to the second device to display the second media object without presenting the media object on the primary display.

In some embodiments, the media guidance application 105 may set the z-ordering of the second media asset to a lower order than the z-ordering of the video content. In some embodiments, the second media object may be associated with audio content and the media guidance application 105 may set the volume associated with the audio content to a lower volume or mute the audio content entirely. In some embodiments, the media guidance application 105 may refrain from processing the second media object for presentation to conserve resources.

In some embodiments, the media guidance application 105 may replace the content of the second media object with content of interest to the user. For example, the media guidance application may obtain a set of preferences from a user profile. Based on the user's preference, the media guidance application 105 may determine a video of interest to the user. For example, the media guidance application 105 may determine that the user enjoys sports highlights and provide the user with a highlight from a recently aired pay-per-view match based on the user satisfying the requirements of the first media object 110 (which may also be related to the same pay-per-view match). In another example, the media guidance application 105 may determine a third media object that would interest the viewer based on, for example, the parameters associated with the third media object, or may determine a third media object as being related to the second media object. In some embodiments, the media guidance application 105 may replace the second media object directly and display the new content in place of the second media object. In some embodiments, the media guidance application 105 may replace the second media object with an indicator that the video of interest is available to the user based on the user satisfying a requirement of the first media object. For example, the media guidance application 105 may inform the user that a pay-per-view highlight is available to the user by textual description.

In some embodiments, the media guidance application 105 may provide an opportunity to the user to comply with another set of requirements to extend the exclusion period. For example, the media guidance application 105 may present a message to the user, reminding them of a subject in the first media object close to the end of the full exclusion period. The media guidance application 105 may determine a threshold amount of time before the exclusion window expires. For example, the exclusion window may include a timestamp of the end of the window, or may include a relative amount of time from the date the exclusion was created. In another example, the media guidance application may determine that the user entered into a 12-month purchase plan for a phone and, one month before the expiration of that agreement, provide the user with an opportunity to purchase an upgraded phone. The exclusion window may also include an extension date or metadata from the creation date to show an extension opportunity. In some embodiments, the media guidance application may calculate the amount of time between the current date and the expiration of the exclusion window and calculate an appropriate date and time to show an extension opportunity. In some embodiments, the media guidance application 105 may convert the current system time to an integer representing the current system time in Universal Time Code ("UTC") format. The media guidance application may also convert an end time of the exclusion window to a UTC integer value. The media guidance application may then subtract the integer representing the current time from the integer representing the end time of the exclusion window to determine the threshold amount of time. The media guidance application may store the threshold amount of time in a variable or other data structure. In some embodiments, the media guidance application 105 may detect that the exclusion period is within a threshold period of expiring. For example, the media guidance application may determine that that 30-day exclusion period will lapse in three days. In response to detecting that the exclusion period is within a threshold period of expiring, the media guidance application 105 may prompt the user to satisfy a requirement of a third media object. For example, the media guidance application 105 may ask the user to watch a short message from a sponsor to extend the exclusion for another 10 days. In another example, the media guidance application 105 may present an opportunity for the user to upgrade a past purchase, e.g., phone, with a new purchase. The media guidance application 105 may determine whether the user satisfied the requirement of the third media object, e.g., that the user watched the short message or purchased an upgrade to a product. In response to determining the user satisfied the requirement of the third media object, the media guidance application 105 may modify the exclusion period of the exclusion window based on the third media object. For example, the new message may be associated with a 10-day extension that is applied to the existing exclusion window. The media guidance application 105 may modify the record linking the user, the exclusion window, and the attributes of the first media object by, for example, changing the expiration date or the length of the exclusion period. If the user did not satisfy the requirements of the third media object, the media guidance application 105 may allow the exclusion period to lapse. For example, the media guidance application 105 may remove the record that links the user, the exclusion window, and the attribute of the first media object. In some embodiments, the record of the link is simply determined to not be active based on an end date or calculation of the active period of the window. If the exclusion window lapses, the media guidance application 105 may display related media objects. For example, the media guidance application 105 may detect that a fourth media object that is related to the first media object is to be generated for display. In response to determining that the fourth media object is related to the first media object, the media guidance application 105 may determine that the exclusion period of the exclusion window has expired and generate, for display, the fourth media object.

In some embodiments, the media guidance application 105 may incentivize the user to interact with the first media object within a certain time by, for example, providing different exclusion windows based on the speed at which the user responds. For example, the media guidance application 105 may present an opportunity for the user to interact with the media object in a race with other users (either at the same time as users or at different times in a virtual race). The user's reaction times may be used to rank the users and provide various opportunities or different exclusion windows based on the reaction times. In some embodiments, the media guidance application 105 may determine a first user reaction time based on a length of time between an initial display of the first media object and the interaction between the user and the first media object. For example, the media guidance application may determine that the user took 15 seconds to respond to a survey provided by the first media object or that the user posted user-generated content three minutes after the first media object was displayed. The media guidance application 105 may then correlate the characteristic of the interaction between the user and the first media object with the exclusion window based on the reaction time. For example, the media guidance application 105 may retrieve a plurality of other user reaction times. The media guidance application 105 may determine that users reacted to the first media object and determine those users' reaction times. The media guidance application 105 may compare the first user reaction time to the plurality of other user reaction times. For example, the media guidance application may order the reaction times for the users. In some embodiments, the media guidance application 105 may group reaction times based on a preset range or based on a computed grouping of reaction times. The media guidance application 105 may select the exclusion window from a plurality of exclusion windows based on comparing the first user reaction time to the plurality of other user reaction times. For example, the exclusion window for the fastest reaction time (or top 10% of reaction times) may provide a longer or more robust (e.g. covering more devices, more subject matters, other related users) exclusion window than is given to users with slower reaction times.

In some embodiments, the media guidance application 105 may apply the exclusion window to other users based on a first user's interaction with the first media object. For example, the media guidance application 105 may keep track, based on user profile information, of users from the same household, same social circles, or same family and provide the exclusion window created in response to one user's interactions with the first media object to other members of the same household, social circle, or family. The media guidance application 105 may receive a command, from a second user, to play video content. During playback of the video content, the media guidance application 105 may detect that a second media object is to be presented to the second user as described above. Some exclusion windows may apply to a second user. A media object may provide an exclusion window to a user that interacted with the media object and also provide the exclusion window to other members of a user's household. When determining whether an exclusion window applies to a media object, the media guidance application 105 may the retrieve one or more records of exclusion windows based on relationships a user has with other users. The media guidance application 105 may, for example, use the second user's profile to determine the user's relationships with other users. The media guidance application 105 may determine that there are several exclusion window available to the second user based on not just the second user's interactions with media objects, but also based on the interactions that other related users made with media objects. The media guidance application 105 may, for example, determine that a record linking an exclusion windows to a user further comprises an indication the exclusion window is available to the second user based on the determined relationship. For example, the media guidance application 105 may determine a current viewer is related to another user based on cohabitating, e.g., family members. When retrieving records of exclusion windows, the media guidance application 105 may retrieve exclusion windows based on the user's interactions along with records based on the related user's interaction.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance application may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figures 3, 4:
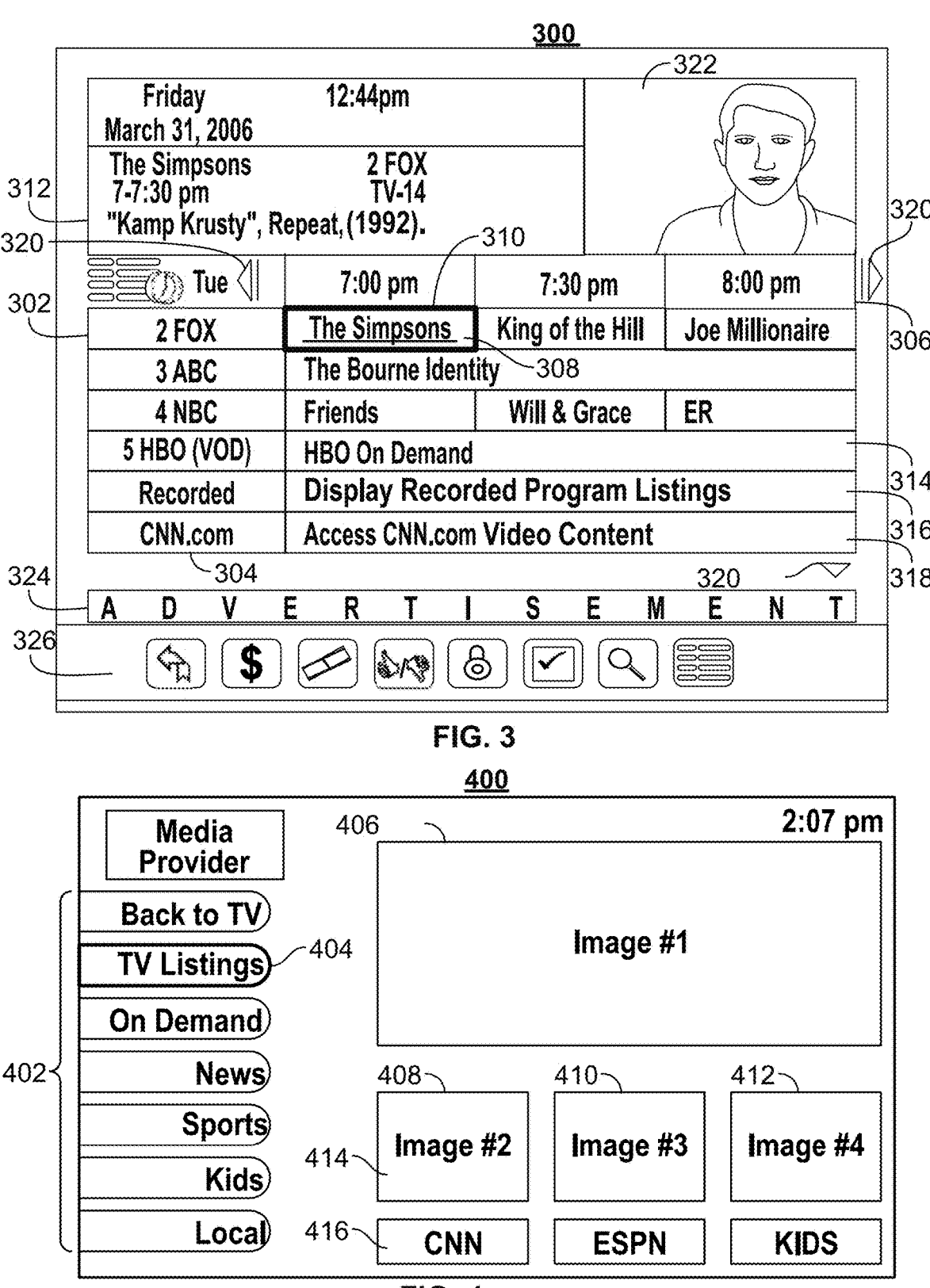
FIG. 3 shows an illustrative embodiment of a display screen that may be used to provide media guidance application listings and other media guidance information, in accordance with some embodiments of the disclosure.
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
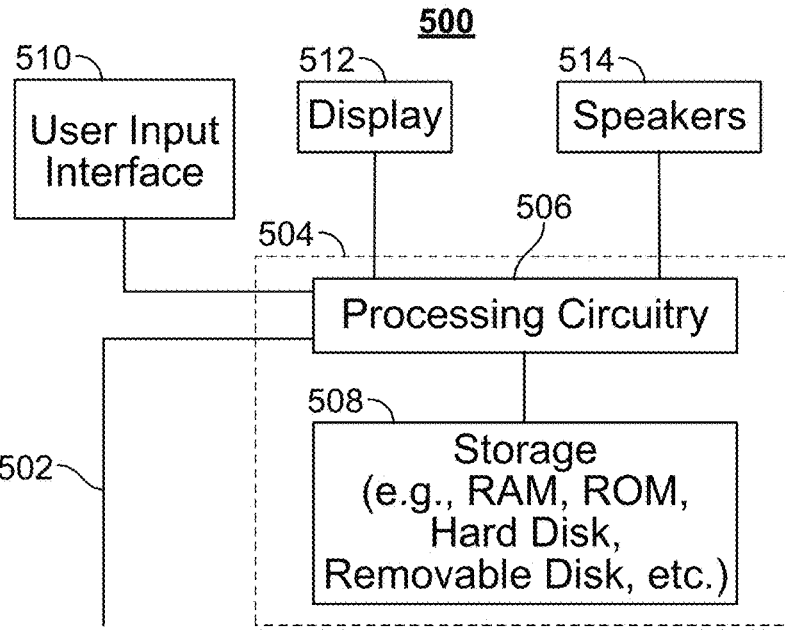
FIG. 5 is a block diagram of an illustrative user equipment (UE) device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN)

modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays.

For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
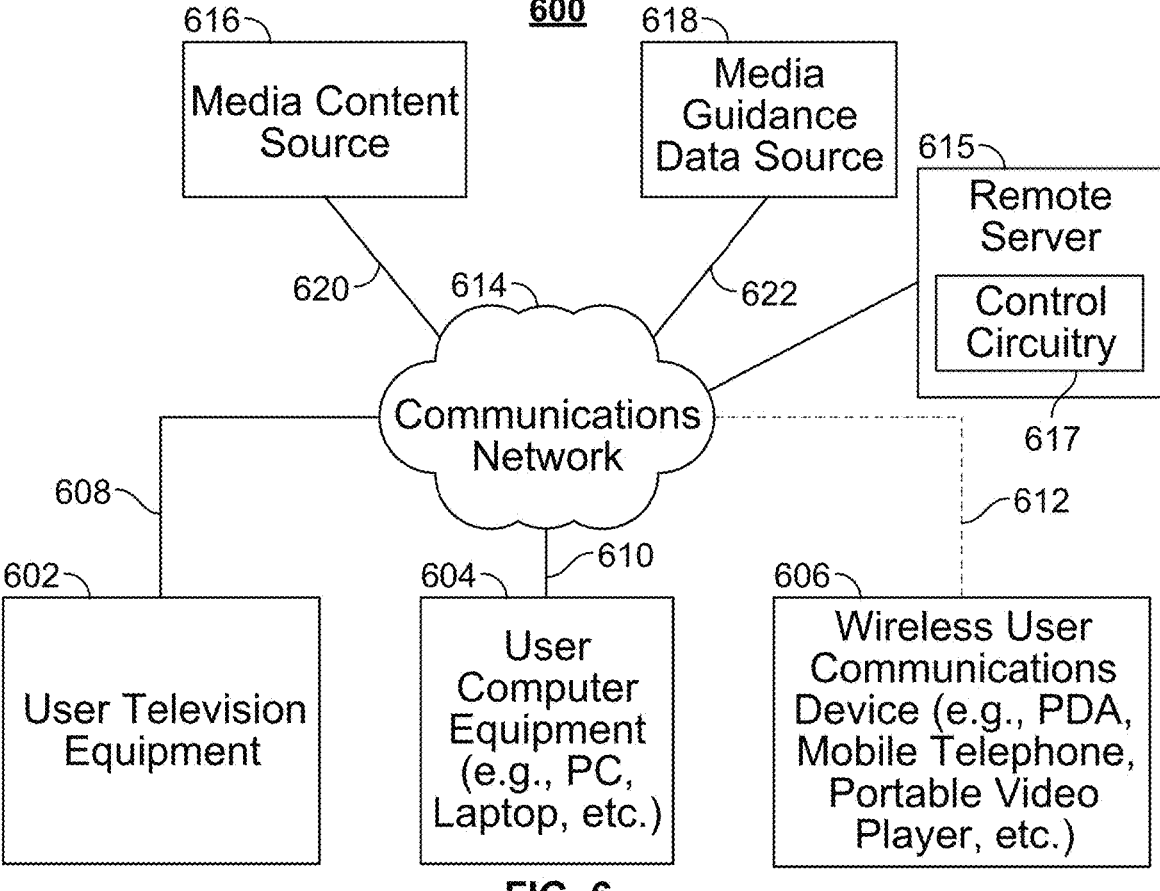
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance application may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
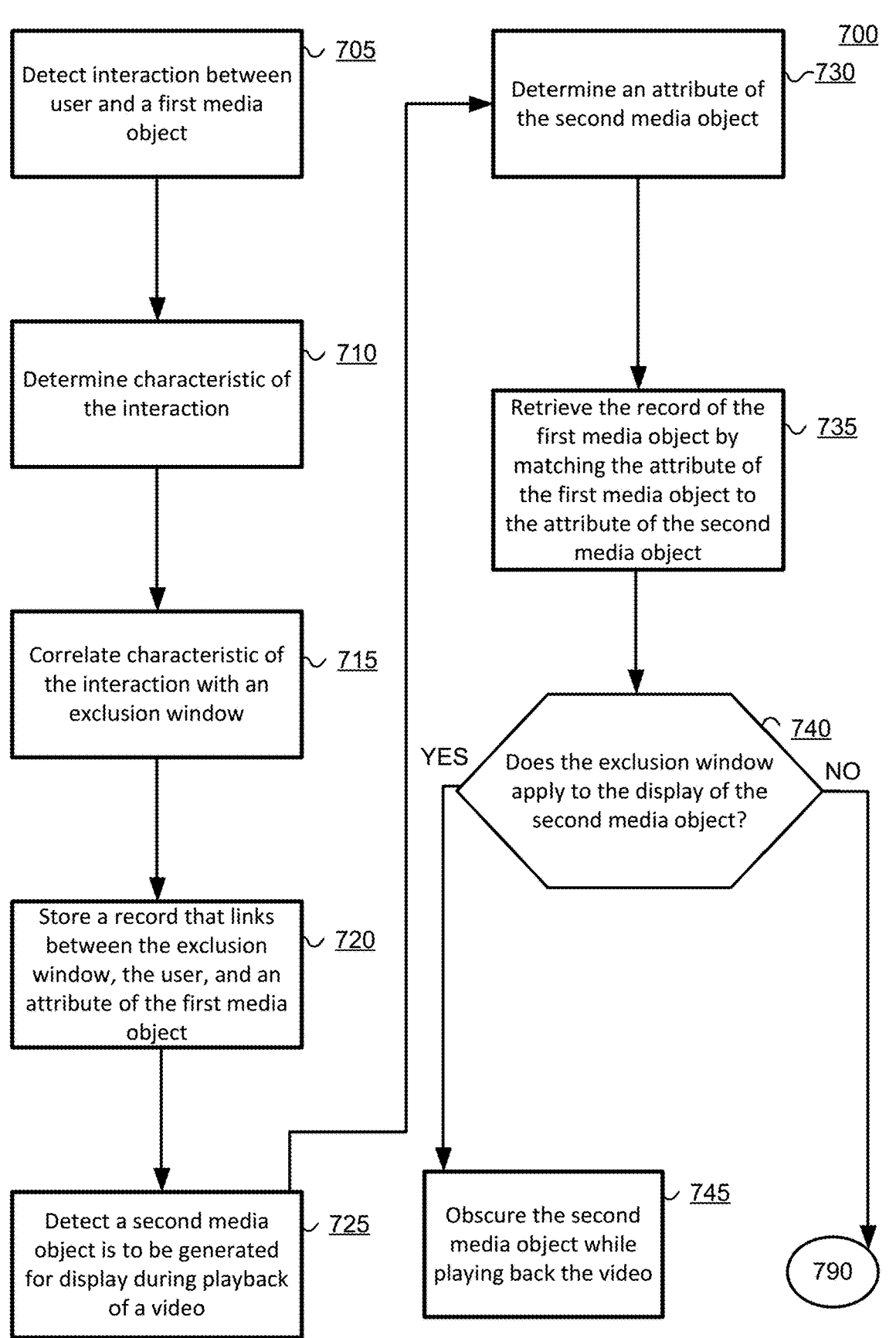
FIG. 7 depicts an illustrative flowchart of a process for obscuring a presence of a media object in a video after a user fulfills an interaction requirement with a related media object in accordance with some embodiments of the disclosure.

FIG. 7 depicts an illustrative flowchart of a process for obscuring a presence of a media object in a video after a user fulfills an interaction requirement with a related media object in accordance with some embodiments of the disclosure. Process 700 may be executed by control circuitry 504 (e.g., in a manner instructed to control circuitry 504 by the media guidance application). Control circuitry 504 may be part of user equipment (e.g., a user equipment generating media guidance application 105, which may have any or all of the functionality of user television equipment 602, user computer equipment 604, and/or wireless communications device 606), or of a remote server separated from the user equipment by way of communication network 614, or distributed over a combination of both.

Process 700 begins at 705, where control circuitry 504 detects an interaction between a user and a first media object. For example, media guidance application 105, using user input interface 510, may detect whether a user invoked actions provided by a first media object or consumed content provided by the first media object.

At 710, control circuitry 504 may be configured to determine a characteristic of the interaction between the user and the first media object. For example, the control circuitry 504 may determine that the user clicked a link, completed a survey associated with a media object, or performed some other action. In some embodiments, the control circuitry 504 may determine the user allowed a video to complete playing on display 512 for a required length of time as depicted in media object 110. Other characteristics may include the amount of time the user spent performing an action related to the media object, the amount of time the user allowed the media object to be displayed, the amount of time it took for the user to react, a number of friends the user shared the media object with, and an amount of content the user-generated in response to the media object 110. In some embodiments, control circuitry 504 may maintain a log file, database, or other data structure listing interactions the user made with the media object 110 along with the amount of time the user interacted. For example, the control circuitry 504 may record, in storage 508, each time a media object is launched, an indication of the media object, and the time at which the media object was launched. When the user closes, exits, or otherwise leaves the media object, the control circuitry 504 may record the time at which the user closed, exited, or left the media object. The control circuitry 504 may then calculate and record a total usage time. Alternatively, the control circuitry 504 may calculate the total usage time upon requesting information related to the media object from the log file, database, or data structure. The control circuitry 504 may further calculate an average time that the user interacts with the media object. In some embodiments, the control circuitry 504 may determine how quickly a user clicked a link provided by the media object, how much content a user-generated in response to a media object, the answers a user provided in response to a survey associated with a media object, and the length of time a user allowed a display 512 or speakers 514 to present a second media object.

In some embodiments, control circuitry 504 determines the characteristic of the interaction between the user and the first media object comprises determining a first user reaction time based on a length of time between an initial display of the first media object and the interaction between the user and the first media object. For example, the control circuitry 504 may determine that the user took 15 seconds to respond to a survey provided by a media object or that the user posted user-generated content three minutes after the media object was displayed.

At 715, the control circuitry 504 may be configured to correlate the characteristic of the interaction between the user and the first media object with an exclusion window. The control circuitry 504 may compare the user interaction collected by user input interface 510 with requirements of the media object to determine which of several exclusion windows should be applied to the user to suppress or obscure related media objects in the future. For example, the control circuitry 504 may determine that a user allowed a media object to play for 20 seconds on display 512 before the user closed the media object using input on user input interface 510. The control circuitry 504 may retrieve a set of criteria that correlates the amount of time the user allowed the media object to play with an agreed-upon exclusion window. For example, allowing the media object to play for less than ten seconds may result in no exclusion period, allowing the media object to play for between 10 seconds and 20 seconds may result in a five-day exclusion period, allowing the media object to play for between 20 seconds and 30 seconds may result in a 10-day exclusion period, and allowing the media object to play for more than 30 seconds may result in a 30-day exclusion period. The control circuitry 504 may retrieve the criteria from storage 508 or extract the criteria from the media object.

In some embodiments, the control circuitry 504 may incentivize the user to interact with the first media object within a certain time by, for example, providing different exclusion windows based on the speed at which the user responds. The control circuitry 504 may correlate the characteristic of the interaction between the user and the first media object with the exclusion window based on the user's reaction time. The control circuitry 504 may retrieve a plurality of other user reaction times, e.g., from storage 508 or from a remote server 615. Each of the plurality of other user reaction times may, for example, indicate a length of time between an initial display of the first media object to a respective user and an interaction between that respective user and the first media object. The control circuitry 504 may compare the first user reaction time to the plurality of other user reaction times and select the exclusion window from a plurality of exclusion windows based on the comparing the first user reaction time to the plurality of other user reaction times. For example, the control circuitry 504 may present an opportunity for the user to interact with the media object in a race with other users (either at the same time as other users or at different times in a virtual race). The user's reaction times may be used to rank the users and provide various opportunities or different exclusion windows based on the reaction times. In some embodiments, the control circuitry 504 may determine a first user reaction time based on a length of time between an initial display of the first media object on display 512 and the interaction between the user and the first media object using user input interface 510. For example, the control circuitry 504 may determine that the user took 15 seconds to respond to a survey provided by the first media object or that the user posted user-generated content three minutes after the first media object was displayed. The control circuitry 504 may then correlate the characteristic of the interaction between the user and the first media object with the exclusion window based on the reaction time. For example, the control circuitry 504 may determine the exclusion window for the fastest reaction time (or top 10% of reaction times), or may provide a longer or more robust (e.g., covering more devices, more subject matters, other related users) exclusion window than is given to users with slower reaction times.

At 720, the control circuitry 504 may be configured to store, in a storage 508 or at a remote server 615, a record that comprises a link between the exclusion window, the user, and an attribute of the first media object. For example, the control circuitry 504 may determine that media objects related to a sponsor should not presented for the next 30 days based on the user's interaction with a sponsor's message and store a record that links the 30-day exclusion window to the user for media objects from that sponsor. An attribute of the media object may be a sponsor name, a company name, a genre, a product name, a media object category identifier, or other information related to a media object. The control circuitry 604 may create a record in a log file, database, or data structure that contains information linking, connecting, or relating the exclusion window, the user, and the attribute of the media object. In some embodiments, the control circuitry 504 may store the exclusion window based on a general attribute of the media object that associates the exclusion window with several subjects as described with reference to FIG. 13.

At 725, control circuitry 504 may continue process 700 by detecting that a second media object is to be generated on display 512 during playback of a video to a user. For example, the control circuitry 504 may play a video, such as an episode of "Mr. Roger's Neighborhood" as depicted in FIG. 1 to a user on display 512. During playback, the control circuitry 504 may receive a second media object for display. For example, the control circuitry 504 may receive another message from a sponsor, be it the same or a different sponsor. In another example, the control circuitry 504 may detect the second media object embedded in the video or may detect the second media object being transmitted in a parallel data stream to the video.

At 730, the control circuitry 504 is configured to respond to detecting that the second media object is to be generated for display during playback of the video by determining an attribute of the second media object. An attribute of the media object may be a sponsor name, a company name, a genre, a product name, a media object category identifier, or other information related to a media object. In some embodiments, the control circuitry 504 may determine an attribute of the second media object based on textual data received in relation to the second media object in accordance with techniques described herein, for example with reference to FIG. 13.

The control circuitry 504 continues process 700 at 735 by retrieving the record that comprises the link between the exclusion window, the user, and the attribute of the first media object. In some embodiments, control circuitry 504 retrieves the record from storage 508 by matching the attribute of the first media object from the record to the attribute of the second media object. In some embodiments, control circuitry 504 may request the record from a remote server 615 using the attribute of the second media object. For example, the control circuitry 504 may use a sponsor's identity and user's identity as lookup values to retrieve possible exclusion windows that match those parameters. In some embodiments, the control circuitry 504 may determine a general attribute of the second media object that associates the exclusion window with several subjects. For example, the control circuitry 504 may determine an attribute of the second media object based on a subject determined from parameters associated with the second media object, such as parameters obtained from textual data received with the second media object.

At 740, the control circuitry 504 is configured to determine whether the exclusion window applies to the presentation of the second media object. For example, the control circuitry 504 may retrieve several exclusion windows from storage 508 based on the current viewer's identity and an attribute of the second media object. In the retrieved exclusion windows, the control circuitry 504 may locate a 30-day exclusion window that is active based on the current date versus a start and end date in the window. In some embodiments, the control circuitry 504 may convert the current system time to an integer representing the current system time in Universal Time Code ("UTC") format. The exclusion window may include a start date and end date, and the end date may be listed as after the current date. Or the exclusion window may not include the start date but includes the end date. The control circuitry 504 may also convert an end time of the exclusion window to a UTC integer value. The control circuitry 504 may then subtract the integer representing the current time from the integer representing the end time of the exclusion window to determine whether there is time remaining for the exclusion period, or the control circuitry 504 may make a determination of whether the end date integer is greater than the current date integer. In further examples, the presence of the exclusion window (without a start or end date) may indicate the exclusion window is active and applies to the second media object.

If the control circuitry 504 determines that the exclusion window does not apply to the presentation of the second media object, the control circuitry 504 continues to 790 and generates the second media object for display to the user.

In response to determining that the exclusion window applies to the display of the second media object, the control circuitry 504 obscures the second media object while playing back the video. For example, the control circuitry 504 may set the transparency of the second media object to fully or partially transparent. In some embodiments, the control circuitry 504 may refrain from displaying the media object, e.g., suppress the generation of the media object on display 512. In some embodiments, the control circuitry 504 may set the x-y position of the second media object to an unused portion of the display 512 or may set the x-y position of the second media object to a coordinate that exists outside the bounds of the display 512. In some embodiments, the control circuitry 504 may send the second media object to a secondary display that is in communication with the control circuitry 504. In some embodiments, the control circuitry 504 may set the z-ordering of the second media asset to a lower order than the z-ordering of the video content. In some embodiments, the second media object may be associated with audio content and the control circuitry 504 may set the volume associated with the audio content to a lower volume or mute the audio content entirely. In some embodiments, the control circuitry 504 may refrain from processing the second media object for presentation to conserve resources. In some embodiments, the control circuitry 504 may replace the content of the second media object with content of interest to the user.

It is contemplated that the actions or descriptions of FIG. 7 may be used with any other embodiment of this disclosure. In addition, the actions and descriptions described in relation to FIG. 7 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 7.

Figure 8:
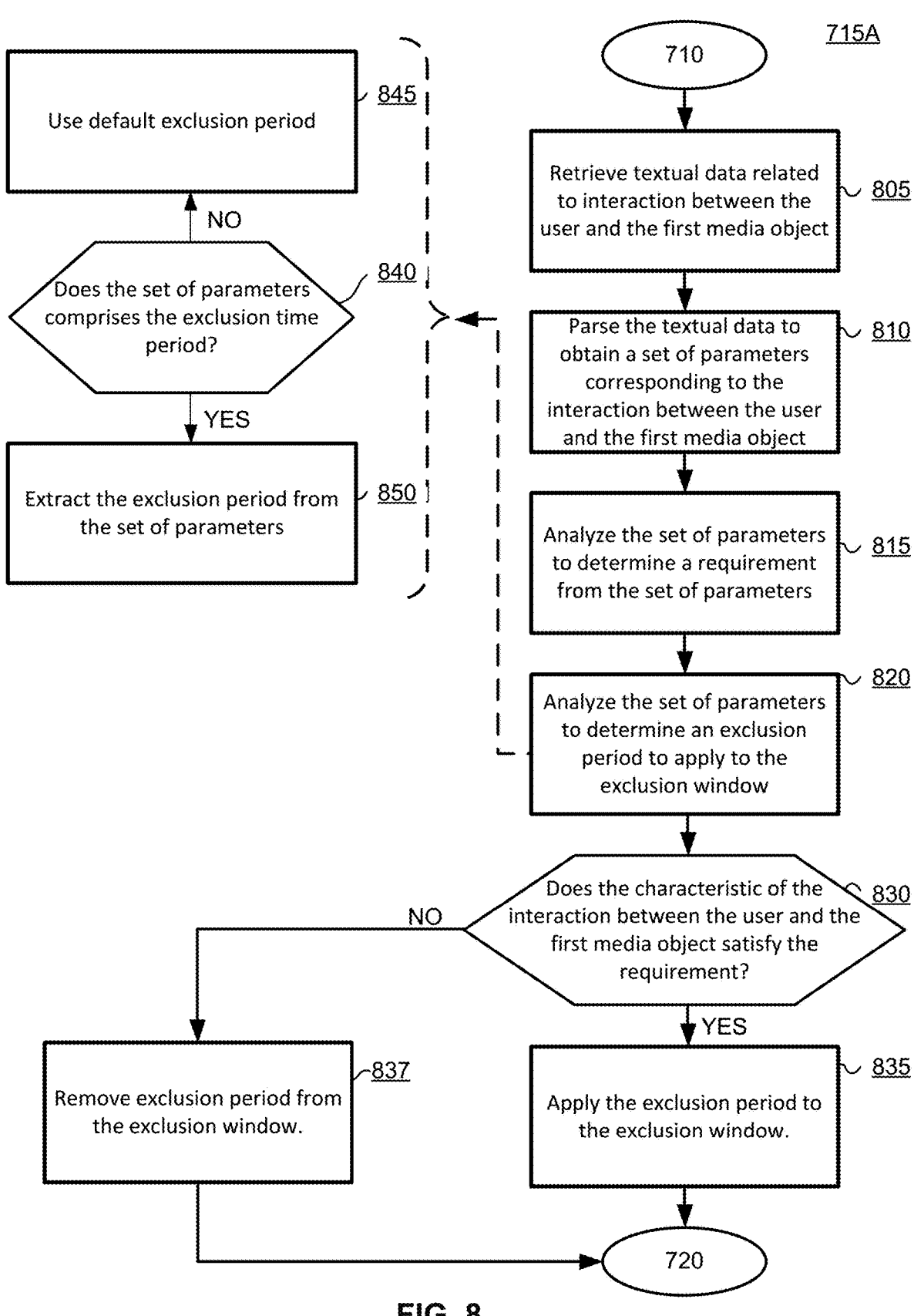
FIG. 8 depicts an illustrative flowchart of a process for correlating characteristics of an interaction with an exclusion window in accordance with some embodiments of the disclosure.

FIG. 8 depicts an illustrative flowchart of a process for correlating characteristics of an interaction with an exclusion window in accordance with some embodiments of the disclosure. Process 800 may be executed by control circuitry 504 (e.g., in a manner instructed to control circuitry 504 by the media guidance application). Process 800 further expands on 715 from FIG. 7. Control circuitry 504 may be part of user equipment (e.g., a user equipment generating media guidance application 105, which may have any or all of the functionality of user television equipment 602, user computer equipment 604, and/or wireless communications device 606), or of a remote server separated from the user equipment by way of communication network 614, or distributed over a combination of both.

Process 800 begins at 805 where control circuitry 504 retrieves textual data related to the interaction between the user and the first media object. For example, the media object may comprise information stating a requirement of the interaction, e.g., "allow 30 seconds of playback of media object without closing to receive 30 days of sponsor-free viewing." In some embodiments, the media object may comprise an identifier used by control circuitry 504 to review textual data from a remote server 615. In some embodiments, the media object may comprise a set of key-value pairs that, collectively, make up the textual data. In some embodiments, control circuitry 504 may extract the textual data from visual content included in the media object intended for display to a user. For example, text may be embedded in a video message and the control circuitry 504 may use optical character recognition, computer vision, or other image analysis to retrieve the textual data.

At 810, control circuitry 504 continues process 800 by parsing the textual data to obtain a set of parameters corresponding to the interaction between the user and the first media object. For example, the control circuitry 504 may analyze "allow 30 seconds of playback of the media object without closing to receive 30 days of sponsor-free viewing" and extract parameters comprising "30 seconds," "playback of media object," and "without closing," "30 days," and "sponsor-free." In some embodiments, the parameters may comprise key-value pairs and the control circuitry 504 may parse the keys and/or the values to obtain the parameters.

At 815, control circuitry 504 is configured to analyze the set of parameters to determine a requirement from the set of parameters. For example, the requirement may be that the user must allow the media object to play for its full length, 30 seconds, without closing the media object to satisfy the requirements of the media object.

At 820, control circuitry 504 is configured to analyze the set of parameters to determine an exclusion period to apply to the exclusion window. For example, the control circuitry 504 may determine the exclusion window is a 30-day window during which the control circuitry 504 will not generate media objects for that sponsor. In some embodiments, control circuitry 504 determines the exclusion period to apply to the exclusion window based on steps 840, 845, and 850. At 840, the control circuitry 504 is configured to determine whether the set of parameters comprises the exclusion time period. For example, the parameters may include "30 days," and "sponsor-free." In some embodiments, the parameters may be in the form of key-value pairs. In such embodiments, the exclusion period may be stored as a value, e.g., "30 days," associated with a key, e.g., "exclusion period." In some embodiments, the control circuitry 504 may perform textual analysis to infer an exclusion period from the parameters. For example, the control circuitry 504 may use natural language processing to identify a part of speech in related text that indicates exclusion period, e.g., "watch video for 30 days sponsor-free viewing" may be analyzed to determine the period is "30 days". If the control circuitry 504 determines the set of parameters does not comprise the exclusion period, the control circuitry 504 may apply a default exclusion period in 845. For example, the control circuitry 504 may retrieve a default exclusion period from storage 508 or from remote server 615. In some embodiments, the control circuitry 504 may use an attribute of the first media object to retrieve the default exclusion period. For example, different sponsors may supply the system with different default exclusion periods for media objects related to that sponsor and the control circuitry 504 may query storage 508 or remote server 615 for the default exclusion period based on the sponsor's name. In response to determining the set of parameters comprises the exclusion time period, the control circuitry 504 may extract the exclusion period from the set of parameters at 850.

Process 800 continues at 830, where control circuitry 504 is configured to determine whether the characteristic of the interaction between the user and the first media object satisfies the requirement. For example, the control circuitry 504 may determine whether the user allowed the media object to play back for 30 seconds without closing the media object. In another example, the control circuitry 504 may determine whether the user reacted to media object in a required amount of time or generated a required amount of user-generated content. In another example, the control circuitry 504 may determine whether the user took an appropriate action or participated in a required survey. In some embodiments, the control circuitry 504 may determine whether the user completed a purchase of a related product.

In some embodiments, control circuitry 504 responds to determining the characteristic of the interaction between the user and the first media object satisfies the requirement by continuing process 800 at 835. At 835, the control circuitry 504 is configured to apply the exclusion period to the exclusion window. For example, the control circuitry 504 may update a log file, data file, a data structure, or a database record with the exclusion period. In some embodiments, the control circuitry 504 may calculate an end date based on the determined exclusion period, e.g., 30 days, and the current date and update the exclusion window to specify that end date or set an expiration date that, when reached, deactivates or deletes the exclusion window.

In some embodiments, control circuitry 504 response to determining the characteristic of the interaction between the user and the first media object does not satisfy the requirement by continuing process 800 at 837. In some embodiments, the control circuitry 504 may remove or delete exclusion windows that currently exist in the system based on a relation to the first media object as discussed above.

It is contemplated that the actions or descriptions of FIG. 8 may be used with any other embodiment of this disclosure. In addition, the actions and descriptions described in relation to FIG. 8 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 8.

Figure 9:
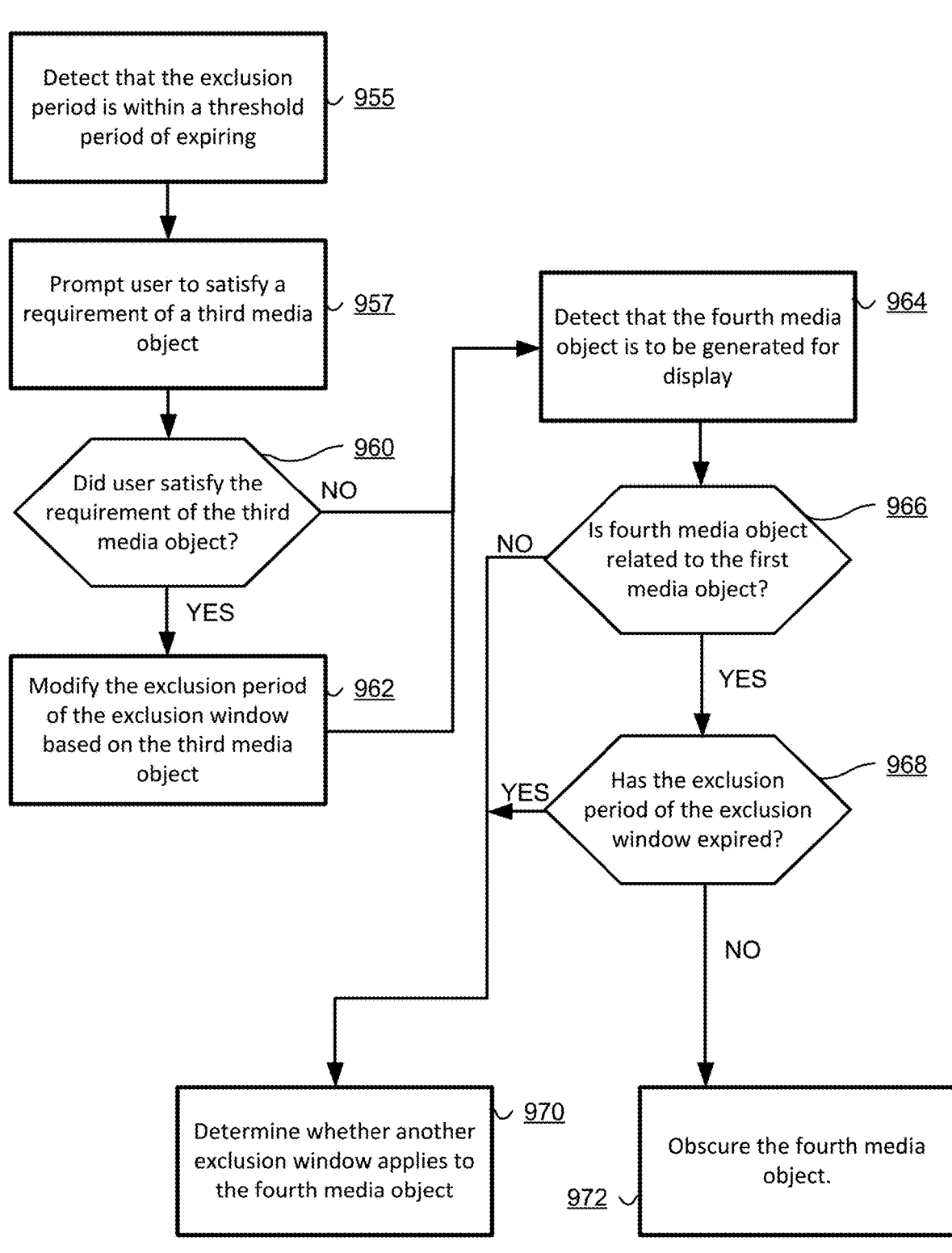
FIG. 9 depicts an illustrative flowchart of a process for extending an exclusion window used for obscuring a presence of a media object in a video after a user fulfills an interaction requirement with a related media object in accordance with some embodiments of the disclosure.

FIG. 9 depicts an illustrative flowchart of a process for extending an exclusion window used for obscuring a presence of a media object in a video after a user fulfills an interaction requirement with a related media object in accordance with some embodiments of the disclosure. Process 900 may be executed by control circuitry 504 (e.g., in a manner instructed to control circuitry 504 by the media guidance application). Control circuitry 504 may be part of user equipment (e.g., a user equipment generating media guidance application 105, which may have any or all of the functionality of user television equipment 602, user computer equipment 604, and/or wireless communications device 606), or of a remote server separated from the user equipment by way of communication network 614, or distributed over a combination of both.

Process 900 is depicted as occurring at some point after an exclusion window has been applied to media objects related to a first media object, e.g., after 835 of FIG. 8 for ease of description. At 955, control circuitry 504 detects that the exclusion period is within a threshold period of expiring. For example, the control circuitry 504 may determine that that 30-day exclusion period will lapse in three days. For example, the exclusion window may include a timestamp of the end of the window, or may include a relative amount of time from the date the exclusion was created. The exclusion window may also include an extension date or metadata from the creation date to show an extension opportunity. In some embodiments, the control circuitry 504 may calculate the amount of time between the current date and the expiration of the exclusion window and calculate an appropriate date and time to show an extension opportunity. In some embodiments, the control circuitry 504 may convert the current system time to an integer representing the current system time in Universal Time Code ("UTC") format. The control circuitry 504 may also convert an end time of the exclusion window to a UTC integer value. The control circuitry 504 may then subtract the integer representing the current time from the integer representing the end time of the exclusion window to determine the threshold amount of time. The control circuitry 504 may store the threshold amount of time in a variable or other data structure.

At 957, control circuitry 504 is configured to continue process 900 by prompting the user to satisfy a requirement of a third media object. For example, the control circuitry 504 may ask the user to watch a short message from a sponsor to extend the exclusion for another 10 days. The control circuitry 504 may present any media object with a requirement to the user in a manner similar to how the control circuitry 504 presents the first media object on display 512. Furthermore, the third media object may comprise an exclusion window, parameters, characteristics, and attributes to be processed by control circuitry 504 with the techniques described herein.

Process 900 continues at 960, where control circuitry 504 determines whether the user satisfied the requirement of the third media object. For example, control circuitry 504 may process the user's interactions with the third media object in a manner similar to that as described with reference to FIG. 7 to determine whether the user satisfied requirements of that media object. If the user does not satisfy the requirement of the third media object, process 900 continues at 964.

In response to determining the user satisfied the requirement of the third media object, process 900 continues at 962 where control circuitry 504 modifies the exclusion period of the exclusion window based on the third media object. For example, control circuitry 504 may retrieve the exclusion window from storage 508 or from the remote server and update the exclusion period of the exclusion window to account for the extension of the exclusion period. In some embodiments, the control circuitry 504 may obtain the end date and add additional time to the end date before saving the record back into storage. In some embodiments, the control circuitry 504 may add additional time to a valid time length that is used along with a start date and save the record back to storage.

At 964, control circuitry 504 is configured to detect that the fourth media object is to be generated for display. The control circuitry 504 may detect the fourth media object in a manner similar to the techniques described with reference to 725 of FIG. 7.

Process 900 continues at 966, where control circuitry 504 determines whether the fourth media object is related to the first media object. If control circuitry 504 determines that the fourth media object is not related to the first object, the control circuitry 504 can continue the process at 970 by determining whether another exclusion window applies to the fourth media object in accordance to the techniques described herein.

In response to determining that the fourth media object is related to the first media object, control circuitry 504 continues at 968 by determining whether the exclusion period of the exclusion window has expired. For example, the control circuitry 504 may determine whether the exclusion window applies to the fourth media object in a manner similar to that as described with reference 740 of FIG. 7. If control circuitry 504 determines the exclusion period of the exclusion window has expired, the control circuitry 504 can continue the process at 970 by determining whether another exclusion window applies to the fourth media object in accordance to the techniques described herein.

At 972, control circuitry 504 is configured to respond to determining that the exclusion period of the exclusion window has not expired by obscuring the presentation of the fourth media object in accordance to the techniques described above with reference to 745 at FIG. 7.

It is contemplated that the actions or descriptions of FIG. 9 may be used with any other embodiment of this disclosure. In addition, the actions and descriptions described in relation to FIG. 9 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 9.

Figure 10:
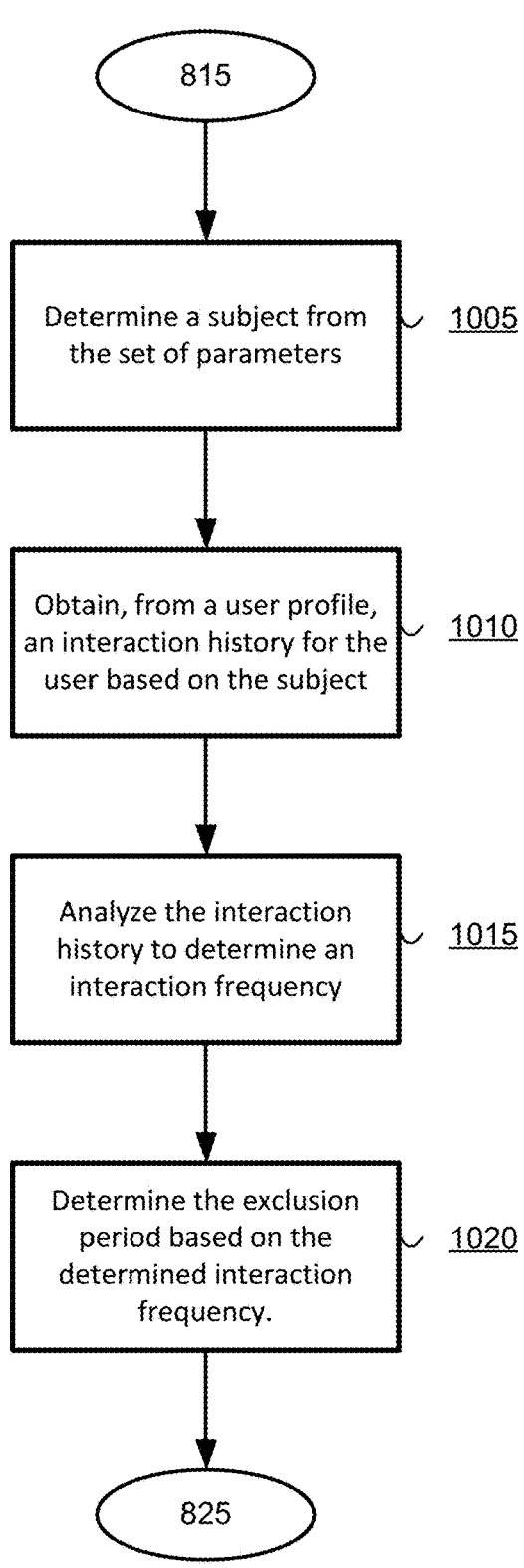
FIG. 10 depicts an illustrative flowchart of a process for analyzing the set of parameters to determine an exclusion period to apply to the exclusion window in accordance with some embodiments of the disclosure.

FIG. 10 depicts an illustrative flowchart of a process for analyzing the set of parameters to determine an exclusion period to apply to the exclusion window in accordance with some embodiments of the disclosure. Process 820A expands process 800 from 820 of FIG. 8. Process 820A may be executed by control circuitry 504 (e.g., in a manner instructed to control circuitry 504 by the media guidance application). Control circuitry 504 may be part of user equipment (e.g., a user equipment generating media guidance application 105, which may have any or all of the functionality of user television equipment 602, user computer equipment 604, and/or wireless communications device 606), or of a remote server separated from the user equipment by way of communication network 614, or distributed over a combination of both.

Process 820A begins at 1005 where control circuitry 504 determines a subject from the set of parameters determined in FIG. 8. For example, textual data of a media object may contain a name or description of the sponsor of a media object or of content in the media object. During the parameter extraction, the control circuitry 504 may also extract this content as a parameter. For example, the control circuitry 504 may identify the name of the sponsor as a parameter and use that name as a subject. In some embodiments, the control circuitry 504 may determine the name of an event or name of an opportunity as the subject of the first media object. In some embodiments, the control circuitry 504 may use natural language processing to determine the subject from the set of parameters. In some embodiments, the control circuitry 504 may query a remote server 615 with information about the parameters to receive a determined subject.

At 1010, the control circuitry 504 is configured to continue process 820A by obtaining, from a user profile from storage 508, an interaction history for the user based on the subject. For example, the user profile may contain a log of the user's interactions with media objects and the control circuitry 504 may retrieve interactions for the subject of interest based on a keyword association in the user profile. The control circuitry 504 may retrieve a series of dates and times when the user interacted with content from the media object, when the user posted user-generated content, when the user purchased certain products or services, when the user attended certain events, and/or when the user participated in certain surveys. Furthermore, the user's interaction history may include other details of those interactions, e.g., the duration of the interaction, the quality of the interaction, and expenditures related to the interactions.

At 1015, process 820A continues where the control circuitry 504 analyzes the interaction history to determine an interaction frequency. For example, the interaction frequency is determined based on an average amount of time between user interactions with media objects related to the subject. The control circuitry 504, may for example, determine that a user interacts with media objects similar to the first media object once every 90 days and, using the 90-day frequency. At 1020, the control circuitry 504 is configured to determine the exclusion period based on the determined interaction frequency. For example, the control circuitry 504 determines that the exclusion period of the exclusion window should be set to 90 days. In some embodiments, the control circuitry 504 may determine an exclusion window based on a portion of or percentage of the frequency. For example, based on a 90-day frequency, the control circuitry 504 may determine to set the exclusion to 80 days.

It is contemplated that the actions or descriptions of FIG. 10 may be used with any other embodiment of this disclosure. In addition, the actions and descriptions described in relation to FIG. 10 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 10.

Figure 11:
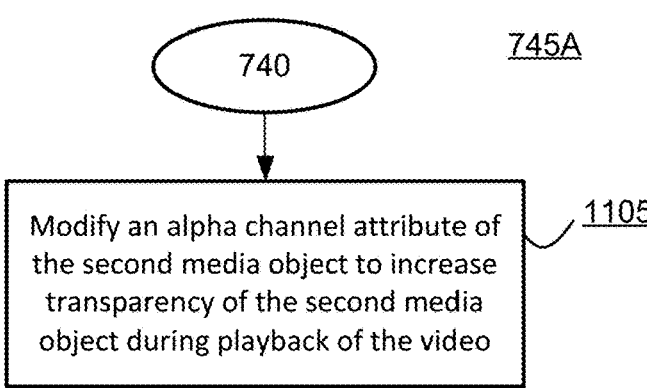
FIG. 11 depicts an illustrative flowchart of a process for obscuring a media object while playing back a video in accordance with some embodiments of the disclosure.

FIG. 11 depicts an illustrative flowchart of a process for obscuring a media object while playing back a video in accordance with some embodiments of the disclosure. Process 745A expands process 700 from 740 of FIG. 7. Process 745A may be executed by control circuitry 504 (e.g., in a manner instructed to control circuitry 504 by the media guidance application). Control circuitry 504 may be part of user equipment (e.g., a user equipment generating media guidance application 105, which may have any or all of the functionality of user television equipment 602, user computer equipment 604, and/or wireless communications device 606), or of a remote server separated from the user equipment by way of communication network 614, or distributed over a combination of both.

In FIG. 11, the control circuitry 504 continues process 700 at 1105 by modifying an alpha channel attribute of the second media object to increase transparency of the second media object during playback of the video. For example, the control circuitry 504 may set the transparency of the second media object to fully or partially transparent when generating the media object for display on display 512.

The alpha channel attribute may be a set of characteristics that define how an image's colors should be merged with other images. In some embodiments, the control circuitry 504 may apply an alpha channel to media object in the form of a masking operation. The value of an alpha channel may be a decimal value in the range, for example, from 0 to 1. A value 0.0 may indicate full transparency and the media object may not appear when the alpha channel attribute is set to 0.0 for a given media object. A value of 1.0 may indicate full coverage so that the media object is fully visibly, i.e., has no transparency.

It is contemplated that the actions or descriptions of FIG. 11 may be used with any other embodiment of this disclosure. In addition, the actions and descriptions described in relation to FIG. 11 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 11.

Figure 12:
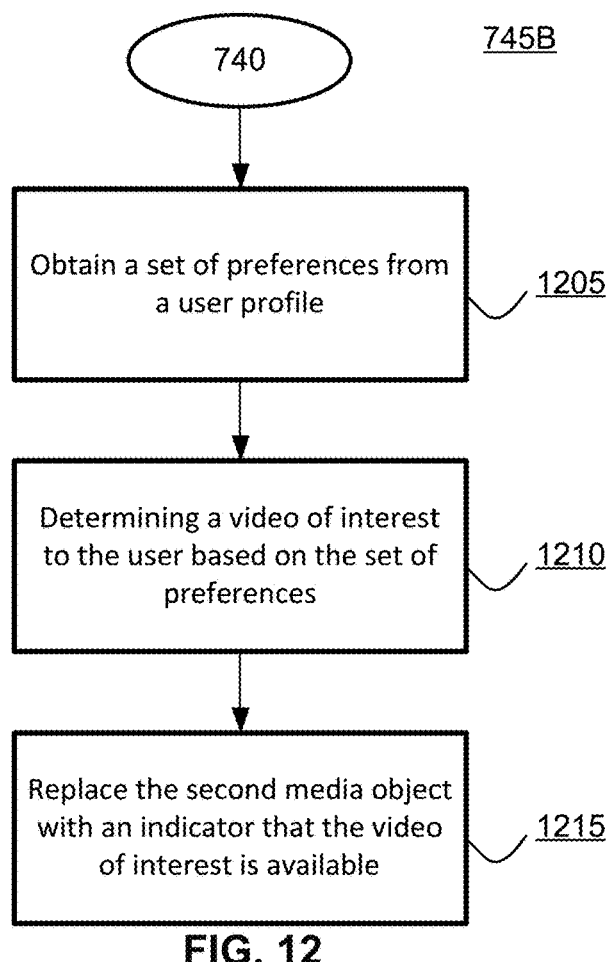
FIG. 12 depicts an illustrative flowchart of a process for obscuring a media object while playing back a video in accordance with some embodiments of the disclosure.

FIG. 12 depicts an illustrative flowchart of a process for obscuring a media object while playing back a video in accordance with some embodiments of the disclosure. Process 745B expands process 700 from 740 of FIG. 7. Process 745B may be executed by control circuitry 504 (e.g., in a manner instructed to control circuitry 504 by the media guidance application). Control circuitry 504 may be part of user equipment (e.g., a user equipment generating media guidance application 105, which may have any or all of the functionality of user television equipment 602, user computer equipment 604, and/or wireless communications device 606), or of a remote server separated from the user equipment by way of communication network 614, or distributed over a combination of both.

In FIG. 12, the control circuitry 504 continues process 700 at 1205 by obtaining a set of preferences from a user profile. For example, the media guidance application may obtain a set of preferences from a user profile. At 1210, the control circuitry 504 is configured to determine a video of interest to the user based on the set of preferences. For example, the control circuitry 504 may determine that the user enjoys sports highlights and provide the user with a highlight from a recently aired pay-per-view match based on the user satisfying the requirements of the first media object 110 (which may also be related to the same pay-per-view match). In another example, the control circuitry 504 may determine a third media object that would interest the viewer based on, for example, the parameters associated with the third media object or may determine third media object as being related to the second media object.

Process 745B continues at 1215, where control circuitry 504 replaces the second media object with an indicator that the video of interest is available to the user based on the user satisfying a requirement of the first media object. In some embodiments, the control circuitry 504 may replace the second media object with an indicator that the video of interest is available to the user based on the user satisfying a requirement of the first media object. For example, the control circuitry 504 may inform the user that the pay-per-view highlight is available to the user by textual description. In some embodiments, control circuitry 504 replaces the content of the second media object with determined content for display on display 512.

It is contemplated that the actions or descriptions of FIG. 12 may be used with any other embodiment of this disclosure. In addition, the actions and descriptions described in relation to FIG. 12 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 12.

Figure 13:
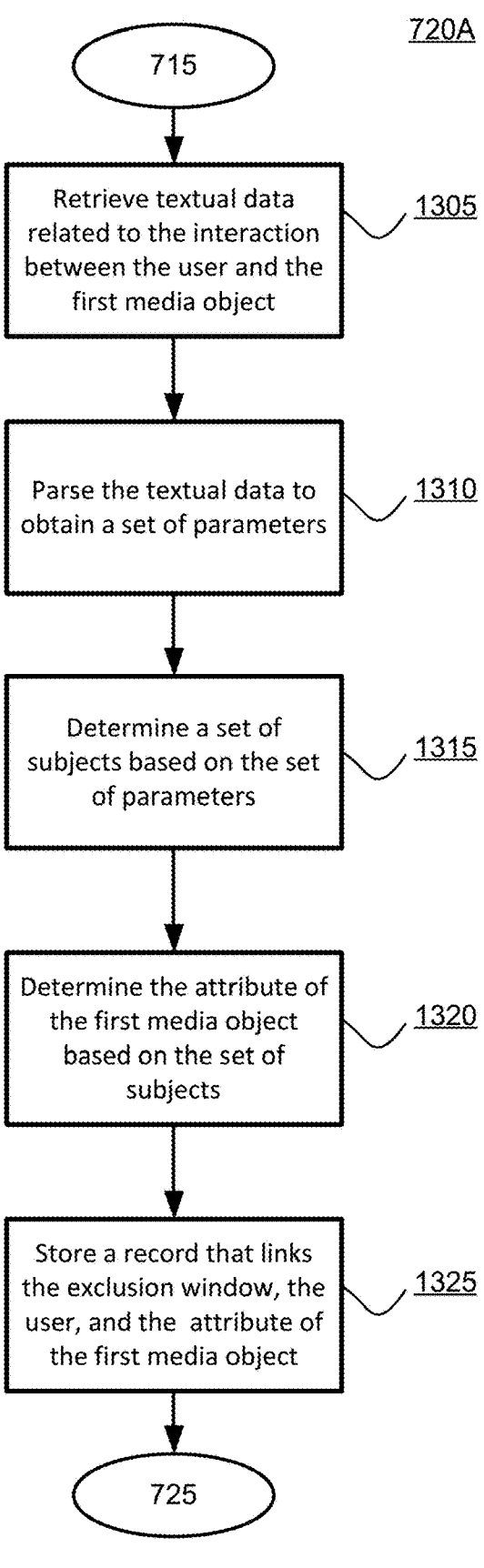
FIG. 13 depicts an illustrative flowchart of a process for storing a record that links between an exclusion window, a user, and an attribute of a media object in accordance with some embodiments of the disclosure.

FIG. 13 depicts an illustrative flowchart of a process for storing a record that links between an exclusion window, a user, and an attribute of a media object in accordance with some embodiments of the disclosure. Process 720A expands 720 of FIG. 7. Process 720A may be executed by control circuitry 504 (e.g., in a manner instructed to control circuitry 504 by the media guidance application). Control circuitry 504 may be part of user equipment (e.g., a user equipment generating media guidance application 105, which may have any or all of the functionality of user television equipment 602, user computer equipment 604, and/or wireless communications device 606), or of a remote server separated from the user equipment by way of communication network 614, or distributed over a combination of both.

Process 720A begins at 1305, where control circuitry 504 retrieves textual data related to the interaction between the user and the first media object. For example, control circuitry 504 may retrieve the textual data in the same manner as described with reference to FIG. 8 at 805. At 1310, process 720A continues with control circuitry 504 parsing the textual data to obtain a set of parameters corresponding to the interaction between the user and the first media object. For example, control circuitry 504 may obtain the set of parameters using the same techniques described with reference to 810 in FIG. 8.

At 1315, control circuitry 504 is configured to determine a set of subjects based on the set of parameters, wherein each of the set of subjects shares at least one parameter of the set of parameters. For example, several sponsors of an upcoming event with media objects promoting an opportunity for the user to interact with the sponsor at an upcoming event may share a parameter related to the event name. In some embodiments, the textual data of a media object may contain a name or description of the sponsor of a media object or of content in the media object. During the parameter extraction, the control circuitry 504 may also extract this content as a parameter. The parameter may be used by the control circuitry 504 to query related sponsors and the control circuitry 504 may obtain the names of the several sponsors as the set of subjects, for example. In some embodiments, the control circuitry 504 may use natural language processing to determine the subject from the set of parameters. In some embodiments, the control circuitry 504 may query a remote server 615 with information about the parameters to receive the set of subjects based on a parameter in the textual data.

At 1320, control circuitry 504 may determine an attribute of the first media object based on the set of subjects that is shared by each of the matching subjects. For example, if each sponsor is from a similar genre, the shared attribute may be the name of the genre, or if a media object is related to a brand, then the attribute may be category that encompasses that brand. In another example, if the sponsor is promoting an opportunity for the user to interact with the sponsor at an event, the shared attribute may be the name of the event. For example, several sponsors may be food vendors at an upcoming event that are participating in shared promotion of the event. If the user interacts with one media object from the set of sponsors, the user may receive an exclusion window that prevents the display of media objects from several of the related sponsors. The control circuitry 504 may determine a shared attribute that would allow a single exclusion window to be related to the set of subjects. For example, the shared attribute may be determined to be an identifier of a category for vendors at the upcoming event. In some embodiments, the control circuitry 504 may create multiple exclusion windows, each window associated with a different one of the subject.

It is contemplated that the actions or descriptions of FIG. 13 may be used with any other embodiment of this disclosure. In addition, the actions and descriptions described in relation to FIG. 13 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 13.

FIG. 14 depicts an illustrative flowchart of a process for obscuring a presence of a media object in a video for a second user after a first user fulfills an interaction in accordance with some embodiments of the disclosure. Process 1400 depicts the continuation of process 700 when an exclusion window created in response to a first user's interaction is applied to a related user and shows an exemplary expansion of 735 of FIG. 7 in steps 1405-1415. Process 1400 may be executed by control circuitry 504 (e.g., in a manner instructed to control circuitry 504 by the media guidance application). Control circuitry 504 may be part of user equipment (e.g., a user equipment generating media guidance application 105, which may have any or all of the functionality of user television equipment 602, user computer equipment 604, and/or wireless communications device 606), or of a remote server separated from the user equipment by way of communication network 614, or distributed over a combination of both.

Process 1400 begins after the storage of an exclusion window in FIG. 7 at 1401 where control circuitry 504 receives a command, from a second user, to play the video. For example, a second user may interact with user input interface 510 to instruct the control circuitry 504 to generate playback of a video on a display 512.

Step 735 of FIG. 7 may then be described in relation to detecting that a second media object should be presented for display during playback of the video to the second user. As described herein, some exclusion windows may apply to a second user, not just the user that interacted with the media object responsible for creating the exclusion window. A media object may provide an exclusion windows to a user that interacted with the media object and also provide the exclusion window to other members of a user's household.

Thus, process 1400 may continue at 1405 with control circuitry 504 retrieving one or more records based on relationships the second user has with other users. The control circuitry 504 may, for example, use the second user's profile to determine the user's relationships with other users. In some embodiments, the control circuitry 504 may access billing data, e.g., account name, account number, billing address, or payment information, and correlate that information with other users. For example, the control circuitry 504 may match the billing address on an account to identify other users in the same household. In some embodiments, the control circuitry 504 may access a datastore with relationship information. For example, a system may provide users with an opportunity to add family members or confirm relationships to other users. The control circuitry 504 may determine that there are several exclusion windows available to the second user based on not just the second user's interactions with media objects, but also on the interactions that other related users made with media objects.

Process 1400 continues at 1410, where the control circuitry 504 is configured determining a relationship between the second user and the user that interacted with the first media object. For example, the control circuitry 504 may retrieve the record of the exclusion window from storage 508 and get the identity of the user that interacted with the media object. The control circuitry 504 may then determine that the first user is directly related to the second user, for example by marriage.

At 1415, the control circuitry 504 continues process 1415 by determining whether the record of the first media object further comprises an indication the exclusion window is available to the second user based on the determined relationship. For example, the exclusion window may include parameters or attributes that indicate that the exclusion window applies to the first user's direct relationships but not to users that are simply in the same social group, e.g., friends. Thus, using the determined relationship of marriage, the control circuitry 504 may determine that, in fact, the exclusion window does apply to the second user. Or, if the case were that the second user was related to the first user only by friendship, then the control circuitry 504 may determine that the exclusion windows does not, in fact, apply to the second user.

In the case that the control circuitry 504 determines that the record of the link between the exclusion window and the attributes of first media object further comprises an indication the exclusion window is available to the second user based on the determined relationship, the control circuitry 504 may continue by obscuring the second media object as previously described with reference to 745 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
   generating media content for display by a device of a plurality of devices associated with a user account;
   generating a first supplemental content for display by a device of the plurality of devices, wherein the first supplemental content is different from the media content;
   identifying a user interface interaction with the first supplemental content;
   determining a characteristic of the identified user interface interaction with the first supplemental content, wherein the characteristic of the identified user interface interaction comprises one or more of:
   receiving indication of repeat displaying of the first supplemental content, receiving indication of increased volume when displaying the first supplemental content, receiving indication of a sharing of the first supplemental content with another user device, or receiving indication of answering a survey associated with the first supplemental content;
   based at least in part on the determined characteristic of the identified user interface interaction with the first supplemental content, determining a length of an exclusion time period;
   determining that the exclusion time period has not elapsed; and
   based at least in part on the determining that the exclusion time period has not elapsed, refraining from causing display of a second supplemental content on a device of the plurality of devices.

2. The method of claim 1, wherein the exclusion time period is commenced at a time of the user interface interaction with the first supplemental content,
   wherein the second supplemental content shares a property with the first supplemental content; and further comprising:
   causing display, within the exclusion time period, of a third supplemental content simultaneously with the display of the media content, wherein the third supplemental content is free of the property shared by the first supplemental content and the second supplemental content.

3. The method of claim 1, wherein the exclusion time period is commenced at a time of the user interface interaction with the first supplemental content,
   wherein the characteristic of the user interface interaction comprises a user reaction time to the display of the first supplemental content.

4. The method of claim 1, wherein the characteristic of the identified user interface interaction comprises the receiving of the indication of the repeat displaying of the first supplemental content.

5. The method of claim 1, wherein the characteristic of the user interface interaction comprises the receiving of the indication of the increased volume when displaying the first supplemental content.

6. The method of claim 1, wherein the characteristic of the user interface interaction comprises the receiving of the indication of the sharing of the first supplemental content when displaying the first supplemental content.

7. The method of claim 1, wherein the characteristic of the user interface interaction comprises the receiving of the indication of the answering the survey associated with the first supplemental content.

8. The method of claim 7, further comprising:
   generating a user notification indicating types of user interface interaction available and lengths of exclusion time periods associated with the types of the user interface interaction available.

9. The method of claim 1, wherein the second supplemental content comprises content different from the first supplemental content.

10. The method of claim 1, further comprising:
   based at least in part on determining that the exclusion time period has elapsed, causing generation of a display of the second supplemental content.

11. A system comprising:
   a memory; and
   control circuitry configured to:
   generate media content for display by a device of a plurality of devices associated with a user account;

generate a first supplemental content for display by a device of the plurality of devices, wherein the first supplemental content is different from the media content;

identify a user interface interaction with the first supplemental content;

determine a characteristic of the identified user interface interaction with the first supplemental content, wherein the characteristic of the identified user interface interaction comprises one or more of:

receiving indication of repeat displaying of the first supplemental content, receiving indication of increased volume when displaying the first supplemental content, receiving indication of a sharing of the first supplemental content with another user device, or receiving indication of answering a survey associated with the first supplemental content;

based at least in part on the determined characteristic of the identified user interface interaction with the first supplemental content, determine a length of an exclusion time period, and storing in the memory an indication of the exclusion time period;

determine that the exclusion time period has not elapsed; and based at least in part on the determining that the exclusion time period has not elapsed, refrain from causing display of a second supplemental content on a device of the plurality of devices.

12. The system of claim 11, wherein the exclusion time period is commenced at a time of the user interface interaction with the first supplemental content, wherein the second supplemental content shares a property with the first supplemental content; and further comprising:

causing display, within the exclusion time period, of a third supplemental content simultaneously with the display of the media content, wherein the third supplemental content is free of the property shared by the first supplemental content and the second supplemental content.

13. The system of claim 11, wherein the exclusion time period is commenced at a time of the user interface interaction with the first supplemental content, wherein the characteristic of the user interface interaction comprises a user reaction time to the display of the first supplemental content.

14. The system of claim 11, wherein the characteristic of the identified user interface interaction comprises the receiving of the indication of the repeat displaying of the first supplemental content.

15. The system of claim 11, wherein the characteristic of the user interface interaction comprises the receiving of the indication of the increased volume when displaying the first supplemental content.

16. The system of claim 11, wherein the characteristic of the user interface interaction comprises the receiving of the indication of the sharing the first supplemental content when displaying the first supplemental content.

17. The system of claim 11, wherein the characteristic of the user interface interaction comprises the receiving of the indication of the answering the survey associated with the first supplemental content.

18. The system of claim 17, wherein the system is configured to:

generate a user notification indicating types of user interface interaction available and lengths of exclusion time periods associated with the types of the user interface interaction available.

19. The system of claim 11, wherein the second supplemental content comprises content different from the first supplemental content.

20. The system of claim 11, wherein the system is configured to:

cause generation of a display of the second supplemental content, based at least in part on determining that the exclusion time period has elapsed.

* * * * *